United States Patent [19]

Nielsen et al.

[11] Patent Number: 5,229,649
[45] Date of Patent: Jul. 20, 1993

[54] LIGHT-ENERGIZED ELECTRONICS ENERGY MANAGEMENT SYSTEM

[75] Inventors: Wyn. Y. Nielsen, La Jolla; Jonathan M. Luck, San Diego, both of Calif.

[73] Assignee: Solatrol, Inc., San Diego, Calif.

[21] Appl. No.: 253,858

[22] Filed: Oct. 4, 1988

Related U.S. Application Data

[63] Continuation-in-part of Ser. No. 250,841, Sep. 28, 1988, which is a continuation of Ser. No. 687,762, Apr. 18, 1991.

[51] Int. Cl.$^5$ ............... H02J 1/00; H02J 7/00; H01J 40/14
[52] U.S. Cl. ............................. 307/31; 307/66; 250/206
[58] Field of Search ............... 307/31, 44, 66; 239/63, 239/69, 70; 250/206

[56] References Cited

U.S. PATENT DOCUMENTS

| | | | |
|---|---|---|---|
| 3,350,618 | 10/1967 | Barney et al. | 307/44 |
| 3,956,638 | 5/1976 | Ahrens et al. | 307/44 X |
| 4,100,407 | 7/1978 | Takahashi | 250/206 X |
| 4,165,532 | 8/1979 | Kendall et al. | 239/70 X |
| 4,180,087 | 12/1979 | Meisner et al. | 239/63 X |
| 4,691,118 | 9/1987 | Nishimura | 307/66 |
| 4,701,693 | 10/1987 | Nishimura | 307/66 X |
| 4,742,291 | 5/1988 | Bobier et al. | 307/66 X |
| 4,775,800 | 10/1988 | Wood | 307/66 X |
| 4,791,948 | 12/1988 | Bayat | 239/70 X |
| 4,794,272 | 12/1988 | Bavaro et al. | 307/66 |
| 4,797,820 | 1/1989 | Wilson et al. | 239/69 X |
| 4,804,858 | 2/1989 | Jorlov et al. | 307/66 |

Primary Examiner—J. R. Scott
Assistant Examiner—Sharon D. Logan
Attorney, Agent, or Firm—William C. Fuess

[57] ABSTRACT

An irrigation controller is powered for all normal operations by light incident upon an 18 square inch photovoltaic module. Electrical power from the photovoltaic module is stored in high performance "super" capacitors. A transportable battery power source is connected to the controller to power its communication, such as for manual exercise and/or the loading of irrigation control programs. The external battery power source leaves the capacitor power storage recharged at the conclusion of each communication episode. The irrigation controller electronics, save for a real time clock that is updated, are not provided with a timing signal, and thereby consume almost no energy, save for brief millisecond sporadic time intervals of scheduled irrigation control. Capacitor power storage is approximately 6.5 mWH. Worse case photovoltaic energy production is 7.6 mWH daily. The sporadically operative irrigation controller uses less than 6.4 mWH per day, with remaining energy expended on up to 128 ultra-low-power valve actuations per day.

28 Claims, 20 Drawing Sheets

Microfiche Appendix Included
(148 Microfiche, 3 Pages)

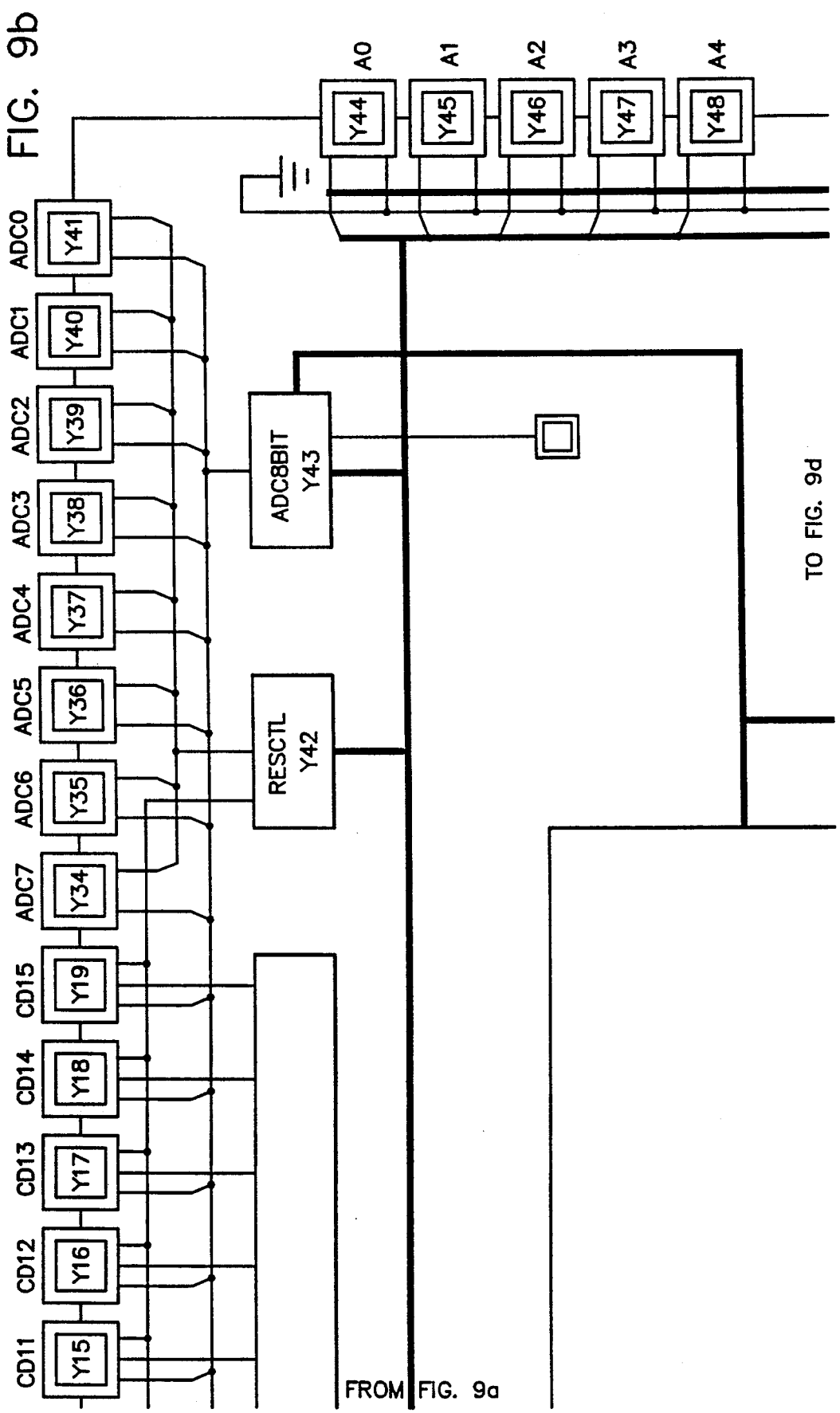

LIGHT-ENERGIZED ELECTRONICS ENERGY MANAGEMENT SYSTEM

The present patent application is a continuation-in-part of patent application U.S. Ser. No. 250,841 filed Sep. 28, 1988 for a FLEXIBLY PROGRAMMABLE IRRIGATION SYSTEM CONTROLLER which application was continued as U.S. Ser. No. 687,762 filed Apr. 18, 1991.

BACKGROUND OF THE INVENTION

1.0 Field of the Invention

The present invention concerns self-energized irrigation control systems and controllers, and particularly irrigation control systems that derive their operational energy at times from light.

2.0 Backqround of the Invention

2.1 Irrigation Controllers and Valves Commonly Use a Remote, Alternating Current, Supply of Power Almost all existing irrigation systems are a.c. powered. Use of a.c. power increases the cost of installing both the controllers themselves and the hydraulic components of the irrigation system as well. Traditional controllers are normally either wall mounted on an internal or external wall of a building or else are pedestal mounted in the landscape. Wall mounted controllers offer the convenience of being located in a central location where there is a.c. power available. However, this central controller location often necessitates the costly installation of long wire runs to bring the required low-voltage wiring from the controller to the valves. Controllers are often specified to reduce the cost of installing wiring to the valves, but a trade-off exists in that the cost of trenching and laying a.c. conduit to supply power to these controllers can be high. In addition, the pedestals alone are expensive. In either case, extensive wiring underneath pavement or heavily used areas is costly to install,repair, replace, or expand to new landscape areas.

Many municipal ordinances require temporary irrigation, before building construction can begin, to stabilize newly graded slopes. Temporary a.c. power has to be installed at considerable cost just to supply power to the irrigation controllers, often long before the actual building development begins.

There are reliability problems associated with dependence on a.c. power. Existing irrigation control systems are often sensitive to power supply disruptions and line spikes. Power outages typically cause a.c. powered controllers to revert to default "backup" programs, and necessitate professional attention to reprogram the controllers. Line spikes and surges can also disrupt or even completely destroy controllers. To protect controllers from line spikes, expensive power conditioning equipment is often specified by designers of irrigation controllers. Effective protection can cost almost as much as the controller itself. Because irrigation controllers are often distributed and wired over broad landscape areas they are frequently effected by line spikes caused by electromagnetic pulse or electrostatic discharge due to lightning.

An additional problem with existing controllers and common 24 volt a.c. valves is that the buried control wires are "ground referenced" and tend to pick up large "ground currents", particularly near power transmission lines. These induced currents have basically the same damaging effects as a.c. power line spikes.

The regulatory environment for the a.c. wiring of irrigation control is tightening. The National Electric Code requires any electrical wiring which is connected to a.c. power mains, and which might come into contact with water or plumbing, to be restricted to 15 volts or less. Presently, nearly all solenoid actuated diaphragm valves operate on 24 volts, so that existing equipment does not comply with this standard. Furthermore, changing to 12 volt solenoids would require more than twice the current to operate valves and hence would demand heavier, more costly, wiring and other components.

The cost of labor and materials in wiring a.c. power to the controllers of an irrigation system is a considerable portion of the overall system cost. For the example of an integrated multi-station irrigation control system for a large residential complex the wiring costs might amount to about 63% of total irrigation system installation cost.

If the irrigation controllers were self-energized, and did not require a.c. power, then they could be located closer to the valves, and the length of low voltage wiring from the dispersed self-energized controllers to the valves would be much reduced. The contractor's wiring costs for the same installation might then be reduced by up to 85%. There is thus a very great cost savings if a.c. wiring could be eliminated in an irrigation control system. If the costs of controllers and valves remained the same (which is by no means certain) then the overall irrigation system installation cost might decrease by up to 54% (i.e., 63% × 85%).

2.1.1 Irrigation Controllers and Valves Typically Require a Remote, Alternatinq Current, Supply of Power Because of Their Energy and Power Use A typical solenoid-actuated diaphragm valve, of which many tens or hundreds are typically used in an irrigation system, draws about 0.25 ampere continuous current at 24 v.a.c., or continuously dissipates about 6 watts. These solenoid-actuated valves are driven by electronic or electromechanical controllers. Because of the heavy power consumption of the solenoids, these systems are typically connected to a.c. power.

Latching solenoid-actuated diaphragm valves are available that draw current for a lesser time duration only upon opening and closing (latching and unlatching). Although these latching solenoid valves are generally more expensive, more complex, and more failure prone, they do reduce total system energy requirements. However, an irrigation system using latching solenoid valves still typically requires about 6 watts instantaneous power upon each occasion of a valve actuation.

An electronic irrigation controller of the type typically used in an irrigation system to typically control a number of irrigation stations or valves typically continuously dissipates about 0.5 amperes current at 120 v.a.c., or 60 watts. The power requirements of an efficient, modern, irrigation control system having a controller and eight typical solenoid valves will thus be recognized to be on the order of 66 watts when driving a valve.

Although a 24 hour per day 365 day per year usage of between 60 and 66 watts electrical power is not an insignificant cost in operating an irrigation system, it is the initial installation costs of an a.c. powered versus a self-energized irrigation system that is a primary problem dealt with by the present invention.

Technological problems exist in realizing a self-energized irrigation system that alleviates any need for the remote supply of power, typically a.c. power. These problems are discussed in the following section. To some extent these problems are a function of the power consumed in an irrigation system. Therefore it is useful to estimate the probable energy consumption of an irrigation system that could be constructed with existing technology so as to be energy efficient. Typical low energy latching solenoid valves require about 24 vdc, 200 ma for 100 msec to change state. An irrigation controller constructed of low-power complementary Metal Oxide Semiconductor (CMOS), Medium Scale Integrated (MSI) and Large Scale Integrated (LSI) circuit technology might use about 200 chips. Such a low power irrigation controller might be built to consume less than 0.01 watts, or 240 milliwatt hours per day. On this power the controller would do sufficient calculation, and would execute an irrigation schedule, that would be sufficient to cycle one or more irrigation valves about 128 total times for all valves. Each of these valve cycles would consume about 480 milliwatt seconds or 0.13 milliwatt hours. The total 128 valve cycles would thus consume about 17 milliwatt hours. The energy budget for a very, very low power custom irrigation system would thus be on the order of 257 milliwatt hours per day, plus losses. This is on the order of 5000 times less than the 1440 watt hours that a conventional controller might use daily. It will be discussed in the following sections how difficult it is to meet even this modest energy budget.

2.1.2 Batteries Can Meet the Power and Energy Requirements for Irrigation Control Systems, But Present Problems Batteries suffice to meet both the power and energy requirements of irrigation control systems. A battery has a low internal resistance, and can typically easily supply the 200 ma of current needed for a short time (about 100 msec) by a latching solenoid valve. The total energy consumption of energy-efficient irrigation systems may also be satisfied by batteries. At least one previous battery-powered irrigation controller exists in the market circa 1988. It uses four standard 6 volt lantern batteries.

Dry cell batteries have proven unreliable to meet the power demands of irrigation control. The battery is in an outdoor enclosure, and is subject to all prevailing climatic extremes of heat, cold, and humidity. The precise longevity of the battery, which is in part based on its intermittent power drain for controlling the switching of irrigation valves, is difficult to calculate. The batteries typically require replacement bimonthly or sooner. Even when often replaced (at considerable cost) the batteries are prone to deteriorate without warning to a condition inadequate to power the irrigation system. Because great damage to vegetation due to under-watering can quickly accrue, especially during hot weather, the failure of an irrigation system due to battery power failure is a highly detrimental occurrence.

2.1.3 Batteries Rechargeable by Solar Arrays Can Power

Irrigation Control Systems, But Present Problems

In response to the high expense, frequent periodic service requirement, and unreliability of using dry cell batteries to power irrigation control systems, at least one solar-powered irrigation control system has been attempted. Wet cell batteries that are approximately the size and power storage capacity of automotive batteries are used in the system. These batteries exhibit a significant charge leakage, or self-discharge rate, even if no energy is drained to power the irrigation control system. The batteries must power a typical irrigation controller that controls 8 latching solenoid valves that are collectively actuated up to 128 total cycles daily. In order to satisfy the leakage and consumed energy requirements a solar array of many square feet, typically at least six (6) square feet, would be required to collect adequate solar power. A solar array this large is expensive, challenging to install and to guard against physical damage, and ungainly in appearance. It is unsuitable for most commercial and residential irrigation applications.

The wet cell batteries, although exhibiting a greater longevity than dry cell batteries, have a relatively short lifetime of months or years. They are expensive and cumbersome to replace. They may be unsafe in some applications where electrolyte leakage could be hazardous to plant or animal life.

2.2 Carbon Paste Electrode Electrolytic Capacitors Can Store Appreciable Energy, But Cannot Discharqe Hiqh Power Per Unit Time Capacitors are a known means of storing electrical charge, or power. Relatively new high performance electrolytic capacitors based on carbon paste electrodes store large electrical charges. One such capacitor is the subject of U.S. Pat. No. 3,536,963.

These high performance, or "super", capacitors can be ranked as devices between a battery and a conventional capacitor. It is known to use these super capacitors as back up power sources in systems with microcomputers and/or CMOS memories.

Unfortunately, super capacitors are not practical to power conventional irrigation systems including controllers and valves. An array of many tens or hundreds of these super capacitors, each of which is relatively more expensive than a battery, would typically be required to store adequate power. An array this large exhibits significant leakage. Such leakage would require a similar, relatively large, solar energy collection array as would be required to keep wet cell batteries charged.

Finally, super capacitors have high equivalent series resistance (ESR), and are accordingly limited in the amount of power that each can deliver per unit time. Although considerate total power can be extracted from many tens, or hundreds of these super capacitors in a parallel array, just a few super capacitors are typically unable to provide adequate current flow so as to actuate a low-power latching solenoid valve.

These cost and electrical current limitations of super capacitors are not unique to their prospective use in rechargeable power sources for conventional irrigation systems. Although these super capacitors exhibit unique properties, their prior application in temporary backup power sources to digital logic devices has required that they should be initially charged by a device power supply that is typically a.c. powered.

2.3 No Matter What Kind of Energy Source is Used for A Self-Energized Irrigation System, the Source Incurs Severe Problems in According Sufficient Energy Storage Capacity So As to Accommodate Asynchronously-Occurring User Communication, and to Act Upon Any Commands Resultant From This Communication An energy source for a self-energized irrigation system would normally be designed to supply all normal, quiescent, energy requirements of the system. If the self-contained energy source were to be solar powered, then the energy collection and storage capacity should be sufficient to maintain the system in operation during periods of night, successive cloudy days, etc.

A self-energized irrigation system must countenance the asynchronous arrival, night or day, of a user-maintainer of the system. The user-maintainer may proceed to communicate with the irrigation controller, cycle the irrigation valves, and/or initiate an irrigation schedule that may call for numerous immediate valve cyclings. Each of these activities is individually difficult to budget and to satisfy with necessary energies. If a self-contained energy source within an irrigation controller or system must power the communication of the system then it must store much more energy than would be needed for quiescent operation. Yet asynchronously-occurring communication demands on the irrigation system by a user-maintainer are completely routine, and are to be expected. These demands place a great, essentially unquantifiable and uncontrolled, demand on the energy source of any self-energized irrigation system. Even when the system energy source is of adequate capacity to meet these demands temporarily, as is normally the case with batteries, it is very common that a user-maintainer's communication with the system will seriously deplete or exhaust the power storage of the system.

This is especially true if the user-maintainer exercises the system by causing cycling of the irrigation valves. All too commonly such an exercise and checkout of a self-energized irrigation system will so exhaust the power storage of the system so as to induce a power outage, and system failure, immediately or shortly after termination of the exercise and checkout.

Still another problem occurs if the user-maintainer sets up a new irrigation control schedule. A rechargeable self-contained energy source, such as a battery recharged by solar power, may have exhausted its day's energy budget in performance of irrigation control and be awaiting recharge prior to again controlling the same diurnal cycle of irrigation. A user-maintainer may set up a new irrigation schedule, while the energy source is depleted, that calls for an immediate energy drain. This energy drain will occur before the source may be, in due course, recharged. It is thus not sufficient that a self-energized irrigation system should avoid unbudgeted energy losses during communication with, or exercise by, a maintainer-user. Rather, the system's energy source must be, for certain scenarios, left with more energy storage after communication than before.

Accordingly, no matter how energy-efficient an irrigation system is, and no matter how generously over-designed is its energy storage capacity, no self-powered irrigation system is likely to store sufficient energy so as to permit that an unscheduled energy drain of significant magnitude may occur asynchronously with normal system power drains for the conduct of irrigation.

SUMMARY OF THE INVENTION

The present invention contemplates powering an electrical system from multiple power sources, the choice of power source being in accordance with the nature of the work that is, at different times, performed by the system. The system is typically an irrigation system that includes an electronic irrigation controller and electrically-actuated valves. The controller, at different times, (i) performs irrigation control and (ii) communicates, either directly or indirectly through an interface, with a user/programmer of the irrigation system.

A light-energized first power source supplies all necessary energy to the irrigation system for its function of irrigation. This first power source includes photovoltaic devices for converting light to electricity and high performance capacitors for energy storage during periods of darkness.

A second power source supplies all necessary energy to the irrigation controller of the irrigation system for its communication function. This second power source is portable, and is typically a battery. The battery is transported to the irrigation controller and electrically connected thereto in order to initiate, as well as to power, communication of the controller with a user/programmer. This communication may either be direct though a man/machine interface provided by local control panel, or indirect through a communications link provided by an I/0 port of custom design.

The irrigation control that is powered by the light-energized first power source typically requires less power per unit time than the user communication that is powered by the portable second power source. This is the case whether or not the user communication transpires through a man/machine interface by the display of messages and the receipt of switch acuations, or through an I/0 channel by the communication of electrical signals. The communication typically takes more power and energy not only because of its requirement to drive a display or transmit an electrical signal, which each require energy, but because the control of irrigation will, in accordance with a further aspect of the present invention to be later explained, require so little power and energy.

Accordingly, the present invention contemplates supplying power from the portable second power source to keep the controller "up" and communicating, when most power is needed, and from a light-energized first power source elsetimes. The dilemma of needing to asynchronously communicate day or night with a power-budgeted electrical system, such as an irrigation controller, having limited power reserves is thereby solved. This is because the initiation of communication inherently brings with it the necessary power to conduct the communication.

Moreover, further in accordance with the present invention, the energy storage capacitors of the first power source are charged by the battery of the second power source. This means that each communication undertaken with the irrigation controller leaves the first power source fully charged and capable of powering subsequent irrigation control, even irrigation control that must commence at night or after the system had previously been subject to a period of disuse and discharge. The second power source not only satisfies the power requirements for communication but always leaves the irrigation system ready to function to the utmost of its first power source storage capacity.

The present invention still further contemplates a new type of power source that stores energy that is derived from light as electrical charge on a capacitor, and particularly on a high performance capacitor. A photovoltaic power source produces voltage in the presence of light energy. A capacitor is diode-connected across the photovoltaic power source. The capacitor accumulates electrical charge from the voltage developed by the photovoltaic power source. A voltage sensor connected across the capacitor produces a control signal when the charge upon the capacitor exceeds a predetermined reference level. A delay circuit receives the control signal and delays it in time in order to produce a delayed control signal. A controllable electrical shunt circuit connected across the photovoltaic power source short circuits the voltage produced by the photovoltaic power source selectively during receipt of the delayed control signal.

The first power source's capacitors are typically of an electric double layer type that store electrical charge at an interface by an electric field between two available phases. One phase is typically activated carbon, and the other phase is an ionically conducting electrolyte, typically sulfuric acid solution. Such capacitor type is commonly called a high performance, or "super", capacitor, and is capable of storing large energies. Four such super capacitors each of 1 farads capacitance are used within the preferred embodiment of the first power source. The capacitors can store in combination about 23 joules =23 watt seconds =6.5 mWH of electrical energy.

Meanwhile, the photovoltaic power source typically produce 35 ma at 10 v.d.c., or 350 milliwatts, at one sun light level from an extremely modest size collector area of 18 square inches. This power production is significantly derated for dim light due to overcast weather or siting, northern latitudes, transmission losses through a transparent cover that may become dirty, and during hours of darkness. Under worse case light levels and siting conditions the photovoltaic power source produces 7.6 mWH of energy daily.

The energy storage and production capacities of the preferred embodiment of the first power source present an extremely challenging energy and power budget for even the quiescent, non-communication, control of an irrigation system.

In accordance with the present invention, this challenge is met. In accordance with the present invention, the irrigation controller is fully "awake" and operating to control irrigation stations only for very short periods of time, on the order of fractions of a second, at typically long time separations, on the order of minutes or hours. The controller is typically awake for 10 milliseconds every second. An elapsed time clock within the controller is constantly updated from a constant frequency source. The rest of the controller logic, consisting primarily of a microprocessor, is completely "dead", or static and inoperative. In this state the logic consumes virtually no power. An elapsed time clock is implemented in CMOS circuitry. It consumes extremely little power, typically much less than a digital watch that must also drive a display. The microprocessor and associated logic circuitry are preferably also implemented in CMOS logic, preferably as two Application Specific Integrated Circuits (ASICs). When so implemented, the entire controller consumes, on a 24 hour basis (of which day the controller is awake only an infinitesimal amount of time) no more energy than 6.4 milliwatt hours. On this energy budget the controller will calculate and execute an irrigation schedule that may control the cycling of one or more ultra-low power irrigation valves up to a total 128 cycles among all valves.

In order to perform communication the irrigation controller must be up and running, or "awake". This means, in the case of a microprocessor-based irrigation controller, that the microprocessor must operate at an acceptable duty cycle and clock rate commensurate with its computational responsibilities to manage communication. The irrigation scheduling and control task is computationally trivial by comparison.

The irrigation system that uses the present invention will preferably be implemented with ultra-low power valve actuators. Such actuators if used would consume on the order of 9.4 microwatt hours per cycle or 1.2 milliwatt hours daily in performing on the order of 128 actuation cycles. Such actuators if used would make the energy consumption of the entire irrigation system to be on the order of 7.6 milliwatt hours per day. This is the minimum power output from the photovoltaic module.

In accordance with the energy storage capacity of the preferred embodiment of the first power source, the self-energized irrigation controller can store enough energy to control 128 irrigation valve cycles without intervening recharge. In accordance with the energy collection capability of the preferred embodiment of the first power source, it can collect sufficient light energy for sustained operation by collection of the incident light falling upon approximately 18 square inches even in northern latitudes (e.g., Canada) on cloudy days. The light-energized first power source will even power the irrigation controller by bright moonlight.

The light energized irrigation controller in accordance with the present invention thus is vastly different from prior irrigation controllers and systems requiring a.c. power, large batteries, and/or large solar collectors. This light-energized quiescent operation is enabled in part because the operation of the controller for communication, drawing more power per unit time, is energized by the portable second, battery, power source. This light-energized quiescent operation is further enabled in part because the controllers active, "on", periods transpire only when and for such duration as is absolutely necessary, with almost all of the power-consuming portion of the controller remaining in a totally unpowered state for almost all of the time.

BRIEF DESCRIPTION OF THE DRAWINGS

FIG. 9a through FIG. 9d is a block diagram of a second, U2, Application Specific Integrated Circuit (ASIC) used in the preferred embodiment of an irrigation controller in accordance with the present invention.

DESCRIPTION OF THE PREFERRED EMBODIMENT

Figure 1:
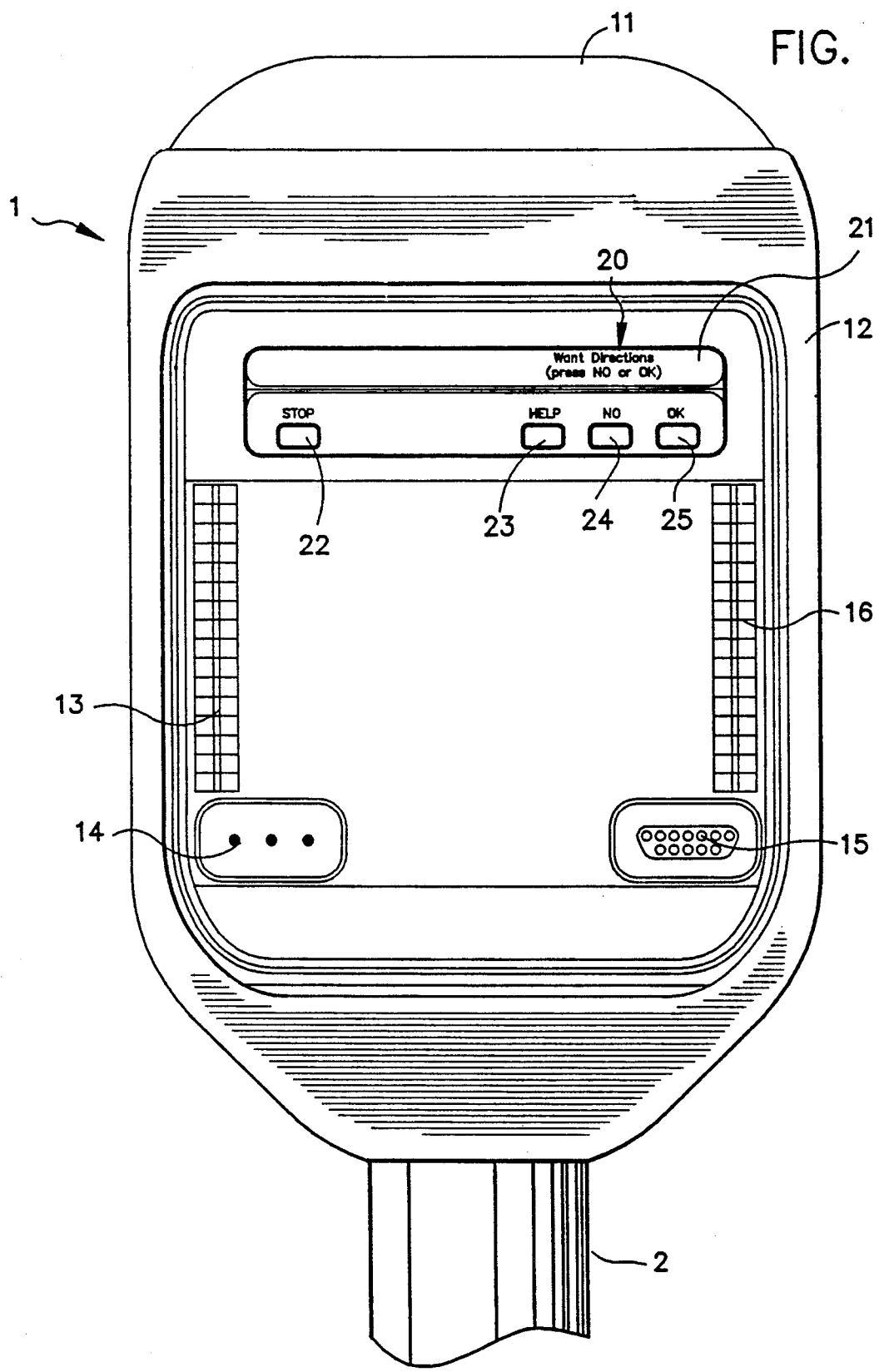
FIG. 1 is a pictorial diagram of an irrigation controller in accordance with the present invention.

1.0 The Preferred Embodiment of the Invention is in a Light-Energized Irrigation Technology Controller The present invention is embodied in an 8-station light-energized irrigation controller. The irrigation controller is spoken of as being "light-energized" and (along with the irrigation valves that it controls) to embody "Light-Energized Irrigation Technology" (LEIT). This description is in lieu of describing, for example, the controller to be "solar powered" because it employs an extremely small area light (solar) collector. Resultant to the small energy collected, the controller uses extremely little energy for all irrigation functions, including control of up to eight (8) valves. The acronym LEIT when applied to irrigation controllers is a trademark of Solatrol, Inc. (assignee of the present invention), i.e., LEIT TM Irrigation Controllers.

1.1 Operational Specification of the Preferred Embodiment of an Irrigation Controller in Accordance with the Present Invention No electrical power input is required. Light energy required is 0.4 milliwatts/sq cm incident light for a minimum of 7 hrs/day. This is equivalent to one tenth of the amount of light at 55° northern latitude (e.g., in Canada) on a cloudy winter's day.

The power for the controller's display (when actuated) is derived from a POWERKEY TM (trademark of Solatrol, Inc.) power source. The POWERKEY TM power source packages a 9-volt alkaline battery that is used to energize the Liquid Crystal Display (LCD) of the controller during installation and programming.

The signal output of the controller to its controlled valves is 3.5 volts DC, 0.04 amps. No circuit breaker and no transformer are required.

Up to 8 valves (including up to 4 Master Valves) may be connected to each controller. Up to 8 electronic soil moisture sensors or optionally, other electronic sensing devices, may also be connected to each controller.

A user-defined emergency backup program and critical system parameters are stored in non-volatile memory in case of memory loss from prolonged light interruption; no batteries are needed.

1.2 The Preferred Embodiment of a LEIT TM Irrigation Controller Interfaces with Certain Optional Accessories The preferred embodiment of a LEIT Irrigation controller in accordance with the present invention interfaces to certain optional accessories and equipments.

A POWERKEY TM (trademark of Solatrol, Inc.) power source is a combination keyring and keyfob-cased battery for powering the display during programming and/or interactive operation.

An optional Multiprogrammer TM unit plugs into the digital interface of the controller for uploading and downloading the watering programs for up to 64 controllers.

An optional WIRESCOPE TM (trademark of Solatrol, Inc.) unit is a hand-held diagnostic unit that checks for proper controller and valve operation from the valve station end of each station wire, and can optionally give an identifying readout of valve and sensor numbers by station and controller.

Up to 8 optional soil moisture sensor units can connect to the controller to give to give precise irrigation system control based on readings of available soil moisture tension, or optionally, percentage soil saturation.

An optional remote test command assembly is a replacement controller face-plate that receives signals from a hand-held transceiver in order to allow wireless remote "manual" operation of valves and sensors from the valve or sensor locations.

An optional radio-link central module mounts permanently below the controller and acts as a transceiver for wireless communication between the controller and a radio-link central system.

The POWERKEY TM power source is manually plugged to the controller in order to provide power to the controller for first use precharging, and during each occurrence of the programming/parameterization of the controller's operation and/or the reviewing of data in the controller's memory. In the latter two cases, the POWERKEY TM power source also provides built-in illumination of the controller's display and control switches. The power source during operation of the controller to control irrigation may be the POWERKEY TM power source if it is still pluggably attached (an abnormal condition), but is normally light (even extremely dim light, such as moonlight) that falls upon the controller.

1.3 Features and Benefits of the Preferred Embodiment of a LEIT Irrigation Controller in Accordance with the Present Invention The preferred embodiment of an irrigation controller in accordance with the present invention is light-energized with a built-in incident light collector. It exhibits sufficient energy storage to drive a custom CMOS ultra-low-power microcomputer with 32 K RAM memory and to cycle up to eight (8) ultra-low-power irrigation valves up to sixteen (16) times per twenty-four (24) hour period. This provides complete independence from any need for AC power, saving on energy and installation costs and permitting the controller to be located closer to the valves.

2.0 Overview

The preferred embodiment of an irrigation controller in accordance with the present invention uses Light Energized Irrigation Technology (LEIT TM). It can operate with the amount of incident light available in northern latitudes on a worst-case cloudy winter's day without needing any of the batteries, external solar panels, or the A.C. power connections required for traditional controllers. It is also extremely flexible and versatile in its operation.

A diagrammatic view of the preferred embodiment of the controller, with its cover plate removed and operator's panel area exposed, is shown in FIG. 1. Controller 1 is typically attached to post 2. An array of photovoltaic devices 10 (not shown) is located under transparent lid 11 to case 12.

Various electrical connectors are presented. A valve connector block 13 permits electrical connection by wires (not shown) to up to eight (8) electrically actuated valves. A control key socket 14 accepts a pluggable POWERKEY TM power source (not shown), being a 9 vdc battery suitably packaged so as to plug into socket 14. A digital accessory connector 15 permits communication connection to a multiprogramming unit (not shown) that may upload and download programs into the controller 1 (among other alternative ways of programming controller 1). The connector 15 is a standard type, and may, under firmware control within controller 1, interface to further devices. A sensor connector block 16 permits connection of up to eight (8) optional soil moisture sensors or other sensing devices. These soil moisture sensors, and the control proceeding therefrom, are not taught within this specification for being unimportant to the present invention.

A control panel 20 contains a liquid crystal display (LCD) 21 for showing information, questions, and directives. The control panel 20 also contains pushbutton switches 22-25. A STOP switch 22 stops the present controller 1 operation and turns off any valves previously turned on. A HELP switch 23 causes the controller 1 to display more information and/or instructions, keyed to the current operation or displayed questions, in LCD 21. The NO switch 24 and the OK switch 25 are used to answer controller-presented questions about the installation and the parameters of irrigation (e.g., the watering schedule) and to enable selectable readout of controller stored data.

The controller 1 is controlled in its operation by firmware running on a special Application Specific Integrated Circuit (ASIC) that includes a microprocessor. The explanation of the controller 1 hardware is contained in major sections 3-5 of this specification. The firmware executed by controller 1 is attached as Appendix A to this specification. This major section 2 deals with the user interface to controller 1, and serves to show its many unique aspects in accordance with the present invention.

The term "programming" used throughout this specification includes actions performed at the operator interface to the controller 1—actions normally but not necessarily performed in the field—by which the controller 1 is parameterized and directed in its programmed operation. The firmware itself is, of course, also "programmed" In some cases the act of "programming" at the operator's panel will alter the flow, as well as the parameters used, within the firmware; thus constituting a form of "programming" at the process control level. The word "programming" is used to refer to the total compendium of operator/programmer interface to, and control of, irrigation controller 1. The word includes actions more exactingly thought of as parameterization (typically done in the field), as well as actions more exactingly thought of as coding (typically done in the factory or depot).

2.1 Overview of the Preferred Embodiment of an Irrigation System

Figure 2:
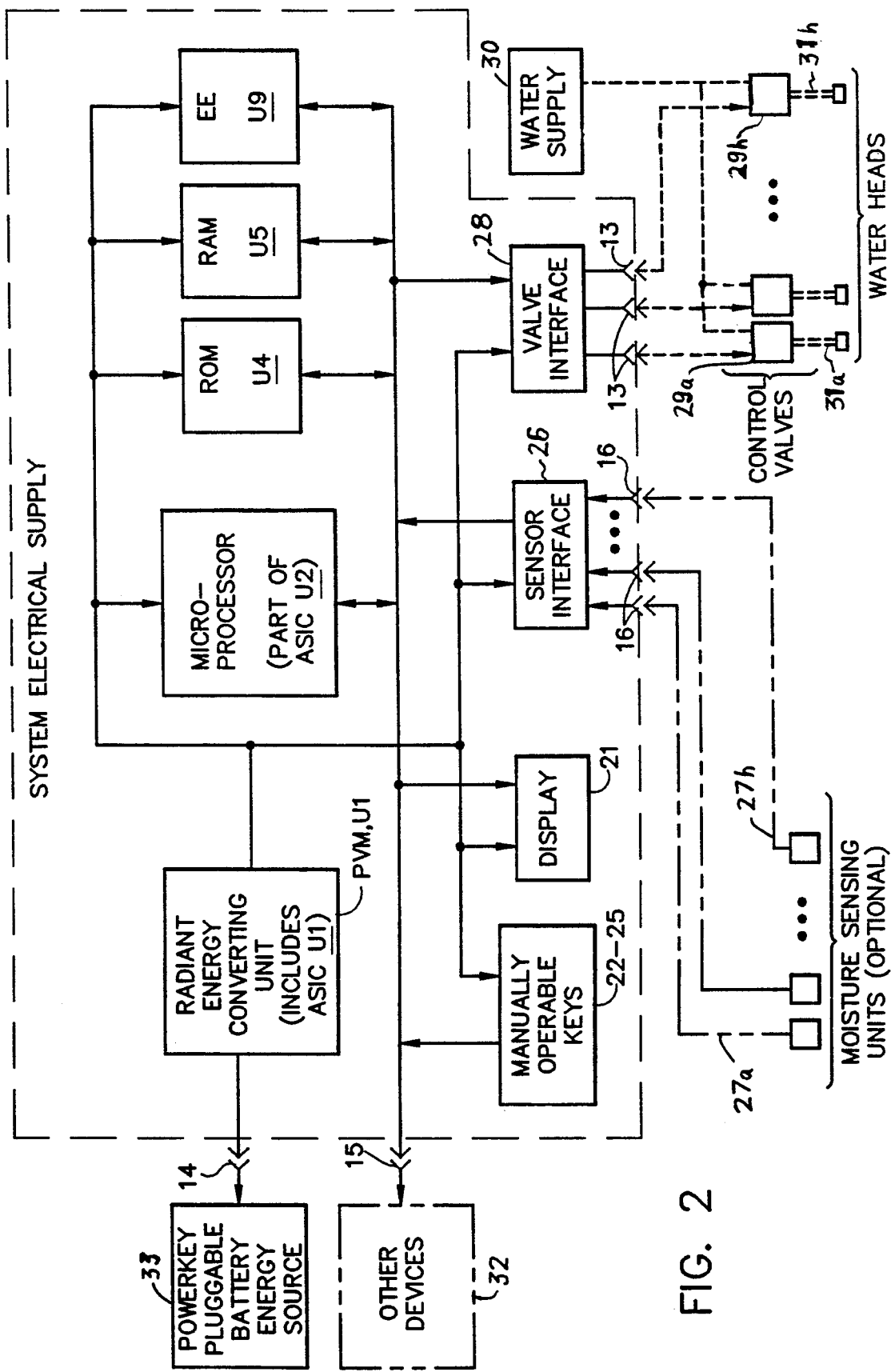
FIG. 2 is a block diagram of an irrigation system in accordance with the present invention including the irrigation controller illustrated in FIG. 1.

A preferred embodiment of an irrigation control system in accordance with the present invention is shown in FIG. 2. An irrigation controller (previously seen in FIG. 1) operates under control of MICROPROCESSOR U2 (partial) executing programmed firmware that is resident in memories types ROM U4, RAM U5, and EE U9. The MICROPROCESSOR U2 (partial) communicates with MANUALLY OPERABLE KEYS 22-25 (previously seen in FIG. 1) for receipt of data and control. It interfaces with DISPLAY 21 (previously seen in FIG. 21) for the display of questions, parameters, and help messages to a human user/programmer (as detailed in previous section 2.0).

The MICROPROCESSOR U2 (partial) of irrigation controller 1 optionally communicates externally through a SENSOR INTERFACE 26 of plugjack 16 (shown in FIG. 1) to up to eight MOISTURE SENSING UNITS (optional) 27a-27h (shown in phantom line). This optional communication is the purpose of sensing soil moisture at up to eight locations. The MICROPROCESSOR U2 (partial) communicates through VALVE INTERFACE 28 of plugjack 13 (shown in FIG. 1) to up to eight electromagnetically actuated CONTROL VALVES 29a-29h (shown in dashed lines). This communication is for the purpose of gating the flow of pressurized water from WATER SUPPLY 30 through a selected one of CONTROL VALVES 29a-29h at any one time to a corresponding one of WATERING HEADS 31a-31h (shown in dashed line).

The MICROPROCESSOR U2 (partial) may optionally communicate through plugjack 15 (shown in FIG. 1) to OTHER DEVICES 32 (shown in phantom line) for purposes of receiving the download of firmware programs, parameters, and/or commands. This interface need not be enabled to operate the irrigation controller 1, which in preferred embodiment comes from the factory with that control program that is appendicized to this specification within its ROM memory U4 and EE memory U9, and which in the preferred embodiment may have all necessary parameters and control entered through MANUALLY OPERABLE KEYS 22-25. Indeed, if necessary firmware could be entered into controller 1 through it's MANUALLY OPERABLE KEYS 22-25. The digital interface to OTHER DEVICES 32 simply represents a less fedious way of communicating.

The preferred embodiment of the controller 1 normally derives all its power, and all power for MOISTURE SENSING UNITS 27a-27h and CONTROL VALUES 29a-29h, during quiescent operation both day and night from radiant light energy impingent upon RADIANT ENERGY CONVERTING UNIT (includes ASIC U1) that comprises each of PVM1, U1, and ASSOCIATED CIRCUITRY. "PVM" stands for photovoltaic module and "ASIC" stands for application specific integrated circuits. All "U" designations stand for integrated circuit chips that may be referenced in FIG. 3 (to be discussed).

The preferred embodiment of controller 1 is powered during its operation to accept user programming not by the RADIANT ENERGY CONVERTING UNIT PVMI, U1, and ASSOCIATED circuitry but rather by electrical connection through plugjack 14 (shown in FIG. 1) to the POWERKEY TM PLUGGABLE BATTERY ENERGY SOURCE 33. This SOURCE 33, normally not a part of irrigation controller 1 during its quiescent operation, is shown neither in shadow line for being optional, nor in dashed line for being related to the controller 1 of the present invention but not part thereof. Rather, the POWERKEY TM PLUGGABLE BATTERY ENERGY SOURCE is shown in solid line in order to illustrate that for the purposes of programming the controller in accordance with the present invention it must be present.

This required presence is because the SOURCE 33 supplies the greater power that the MICROPROCESSOR U2 (partial) needs to exit the predominantly somnolent (inactive ) state that it only intermittently and momentarily leaves to effect irrigation control in accordance with the schedules, and to assume a high duty cycle at operation. The SOURCE 33 also supplies the power requirements of MANUALLY OPERABLE KEYS 22-25 and of DISPLAY 21 during user programming. Although the energy storage within the RADIANT ENERGY CONVERTING UNIT might suffice to permit user programming, it is unwise to deplete this energy storage to an undetermined amount (dependent on the length and adeptness of user programming)—especially at night when no energy recovery is possible and especially when the controller is programmed to immediately begin controlling irrigation cycles. Instead, the SOURCE 33 actually charges the energy storage means within the RADIANT ENERGY CONVERTING UNIT, and always leaves the controller 1 fully powered and ready to control irrigation of the end of a user programming sequence.

Figure 3:
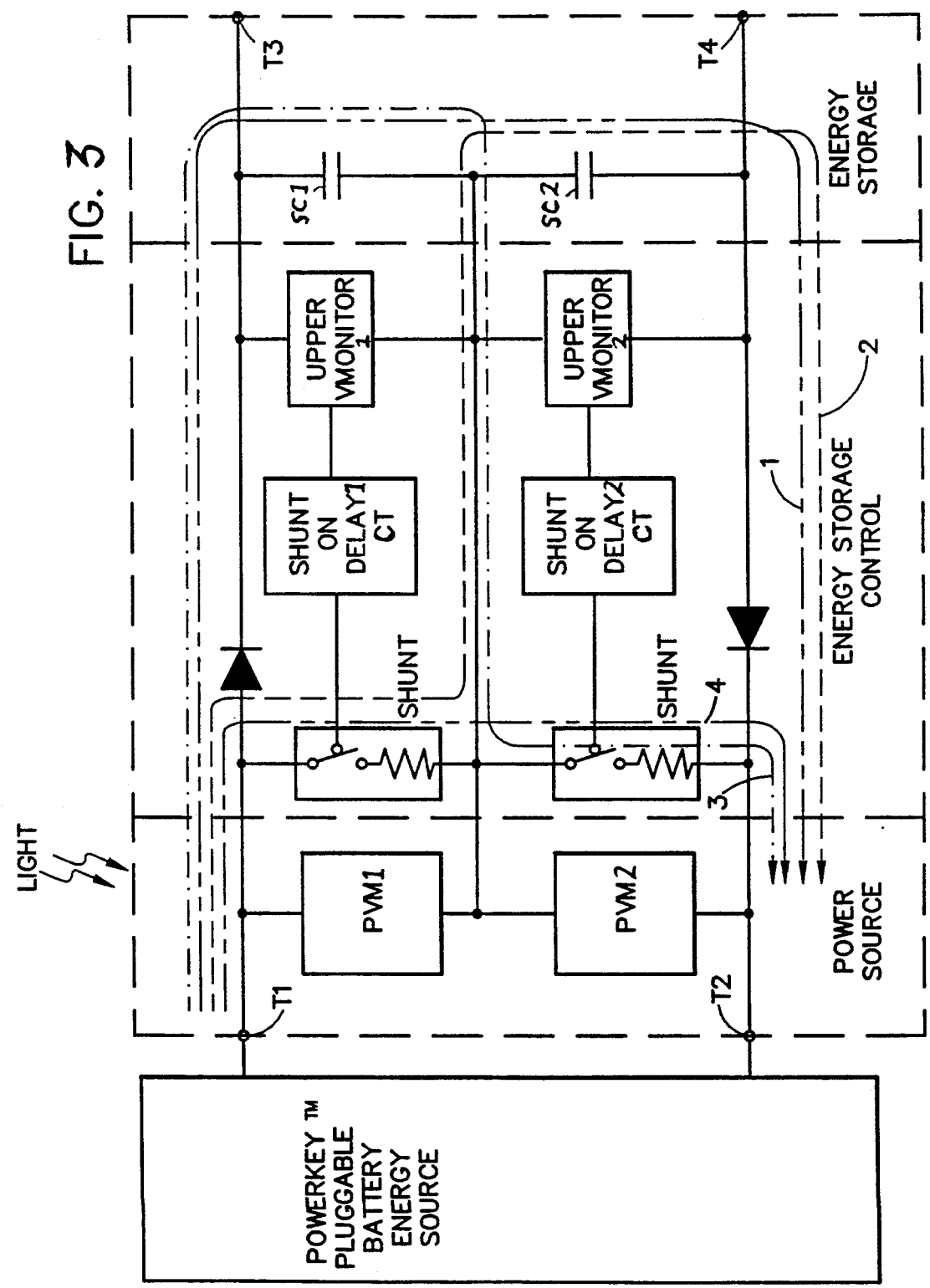
FIG. 3 is a block diagram of first, photovoltaic, and second, battery, power sources for the irrigation controller of the present invention.

2.2 Basic Electrical Circuit for the Capacitor Storage of Energy from Light, and for Energy Management Within an Electronics Device Requiring at Times More Energy Than is Stored An electrical circuit implementing the basic principles of the invention is shown in block diagram in FIG. 3. The RADIANT ENERGY CONVERTING CIRCUIT PVM, U1 (previously seen in FIG. 2) consists of PHOTOVOLTAIC POWER SOURCE, ENERGY STORAGE CONTROL, and ENERGY STORAGE sections. A POWERKEY PLUGGABLE BATTERY ENERGY SOURCE is connectable to terminals T1, T2 of circuit PVM, U1. When so connected it is in electrical parallel with the PHOTOVOLTAIC POWER SOURCE that consists of two series-connected photovoltaic modules PVM1, PVM2. The modules PVMI, PVM2 produce voltage from incident LIGHT ENERGY. Both the POWERKEY PLUGGABLE BATTERY ENERGY SOURCE and the PHOTOVOLTAIC POWER SOURCE act as power sources.

It should be envisioned that still other sources of electrical energy might complement the PHOTOVOLTAIC POWER SOURCE, and provide additional power when required to the irrigation controller 1, than a battery in the form of the POWERKEY PLUGGABLE BATTERY ENERGY SOURCE. The controller 1 might be temporarily connected to a d.c. power supply that was an engine or an a.c. wall outlet, available. A d.c. generator might generate power from flowing irrigation water. The controller might thus control the periodic generation of its own supplemental energy supply.

The energy derived from either the PHOTOVOLTAIC POWER SOURCE or the POWERKEY PLUGGABLE BATTERY ENERGY SOURCE is gated by the ENERGY STORAGE CONTROL to be stored in the ENERGY STORAGE. The terminals T3, T4 across the ENERGY STORAGE supply power to the rest of irrigation controller 1. The ENERGY STORAGE section is based on capacitors, and more particularly on high performance electrolytic capacitors having a carbon paste electrode, commonly called "super" capacitors.

The super capacitors SC1, SC2 must be maintained charged to a limited amount and not overcharged or subjected to overvoltage. Control of the charging of the super capacitors SC1, SC2 is the function of the ENERGY STORAGE CONTROL section. The voltage upon each of the super capacitors SC1, SC2 is respectively monitored by voltage sensing and monitoring circuits UPPER V MONITOR UPPER V MONITOR 2. These circuits produce a control signal when the charge upon the associated super capacitor SC1, SC2 exceeds a predetermined reference voltage, normally 5.4 volts d.c. The control signals from each of the UPPER V MONITOR 1 and UPPER V MONITOR 2 circuits are respectively routed through the SHUNT ON DELAY 1 and SHUNT ON DELAY 2 circuits, and each signal is delayed. The delayed control signals are then used to respectively close the SHUNT 1 and/or SHUNT 2 circuits in order to respectively short circuit the voltage produced by photovoltaic power sources PVM1, PVM2 from further charging the respective super capacitors SC1, SC2.

The current flow path for the simultaneous charging of super capacitors SC1, SC2 is identified in FIG. 3 by the numeral 1. If super capacitor SC1 is fully charged (i.e., to 5.4 v.d.c.) then after a delay time SHUNT 1 will close and the current path will be as indicated by numeral 2. Conversely, if super capacitor SC2 is the only super capacitor fully charged then, after a delay, the current path will be as indicated by the numeral 3. When both super capacitors SC1, SC2 are fully charged (to the predetermined threshold level), then both SHUNT 1 and SHUNT 2 will be conductive and the current flow produced by photovoltaic modules PVM1, PVM2 will be sunk in the shorting resistances of the shunt circuits through path 4.

Figure 4A:
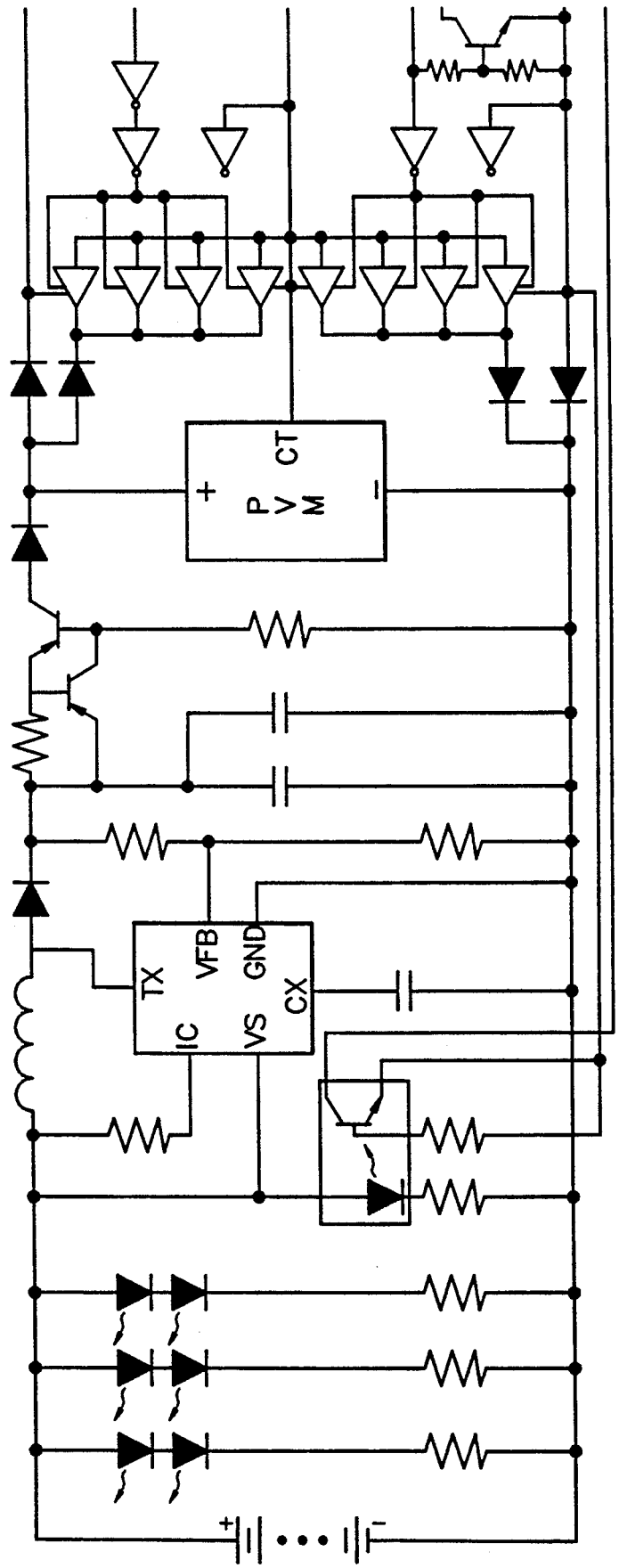
FIGS. 4a through 4b are an electrical schematic diagram of a first embodiment of a light-energized first power source in accordance with the present invention for powering a device and/or system, particularly for powering an irrigation controller and an irrigation system.
Figure 4B:
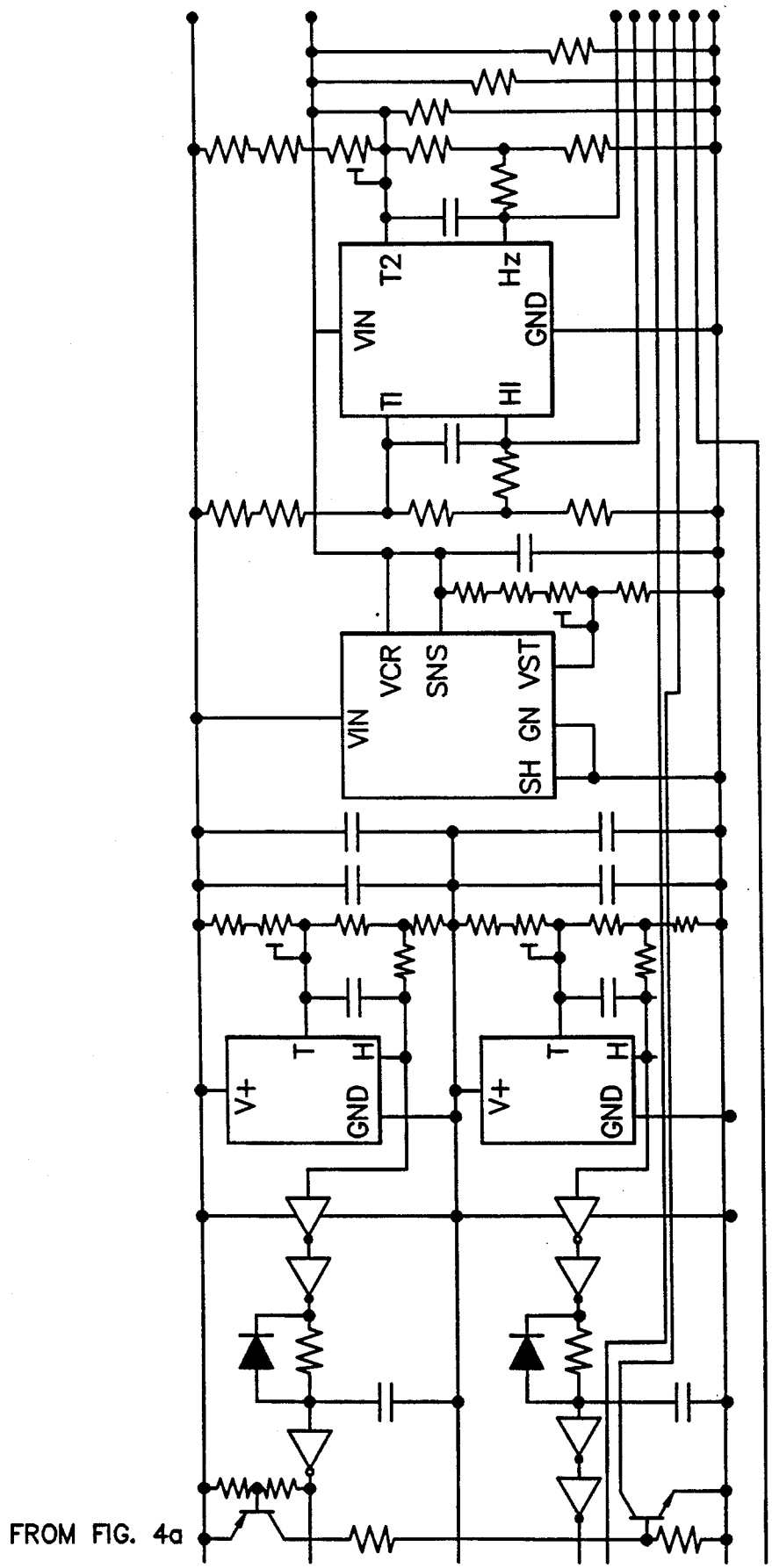

A detail schematic of a first embodiment of the first power source electrical circuit that is block diagrammed in FIG. 3 is shown in FIG. 4. It may be noted that four super capacitors are actually used, and are arranged as two in series in parallel with the remaining two in series. The operation of the circuit shown in FIG. 4, which is implemented with discrete components, may be recognized by reference to FIG. 3.

Figure 5A:
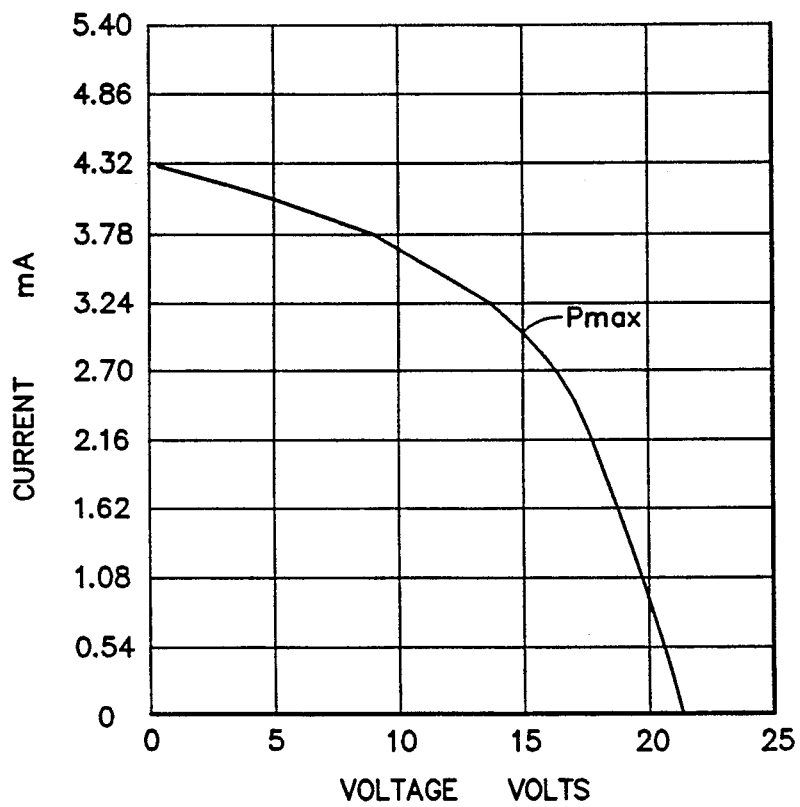
FIG. 5a is a diagram of the voltage charging waveform on the "super" capacitors within the first embodiment of the light-energized first power source.

The charging voltage waveform on the super capacitors is illustrated in FIG. 5a. The voltage rises until V upper (Vu) normally 5.4 volts for each super capacitor (10.8 volts for a series connected pair) is exceeded. After a delay time the shunt circuit closes, and the voltage across the super capacitor quickly falls off, meaning that the voltage level Vu-V hysteresis is quickly reached. The shunt circuit opens and charging recommences. This charging is maintained for the delay time even through Vu is soon exceeded. This predetermined delay time is typically 10 msec. The alternate charging and shunting continues. The super capacitor even more slowly decays in voltage to Vu - V hysteresis. Ultimately a short, typically 10 msec. interval of charging occurs only infrequently (if charging voltage is even available due to the presence of light). If the super capacitor is discharged, causing a fall in its voltage, then recharging will immediately commence in the presence of a charging voltage developed from incident light energy.

Figure 5B:
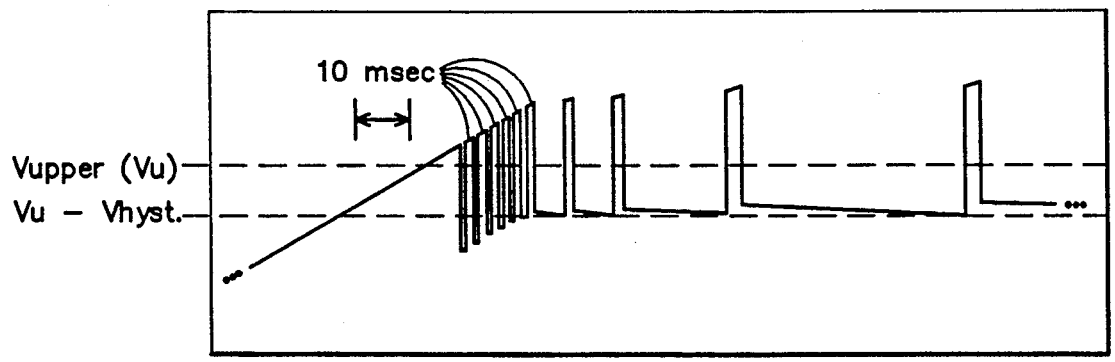
FIG. 5b is a graph of the current versus voltage supplied by the first embodiment of the first power source.
Figure 6A:
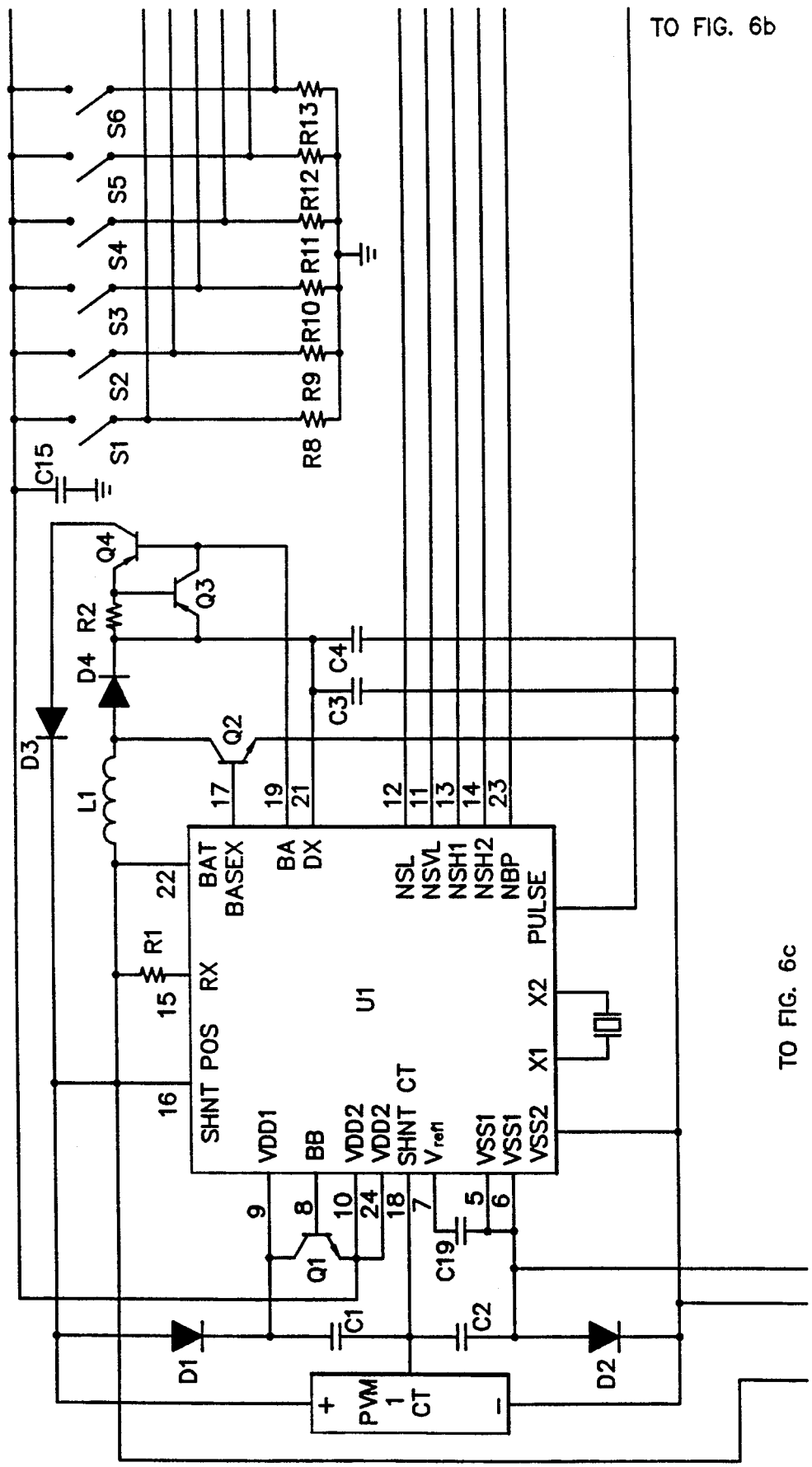
FIG. 6a through FIG. 6h is a schematic diagram of the preferred embodiment of an irrigation controller in accordance with the present invention including a second, preferred, embodiment of the first power source.
Figure 6B:
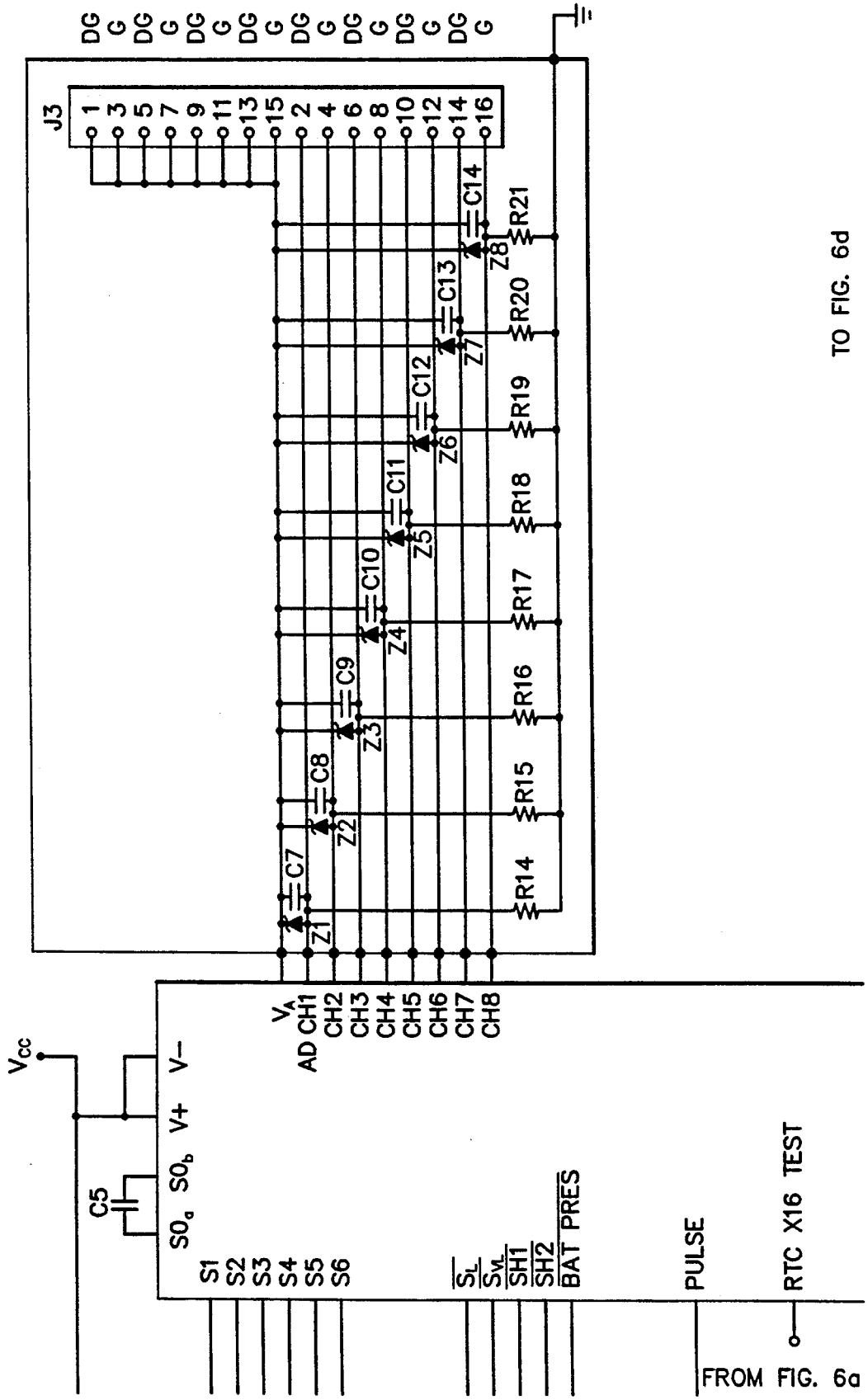
Figure 6C:
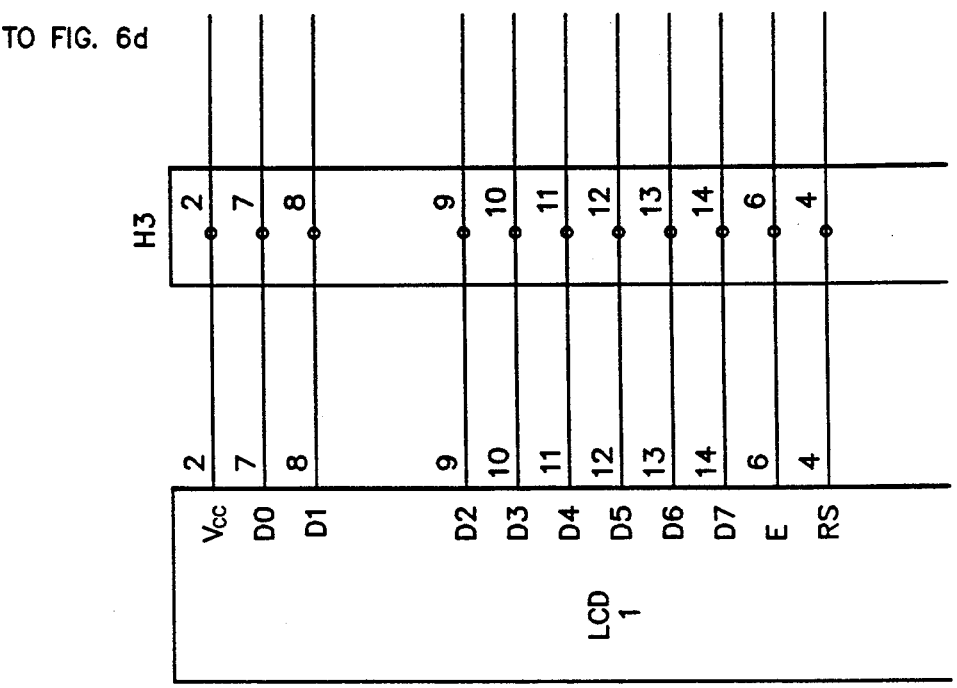
Figure 6C:
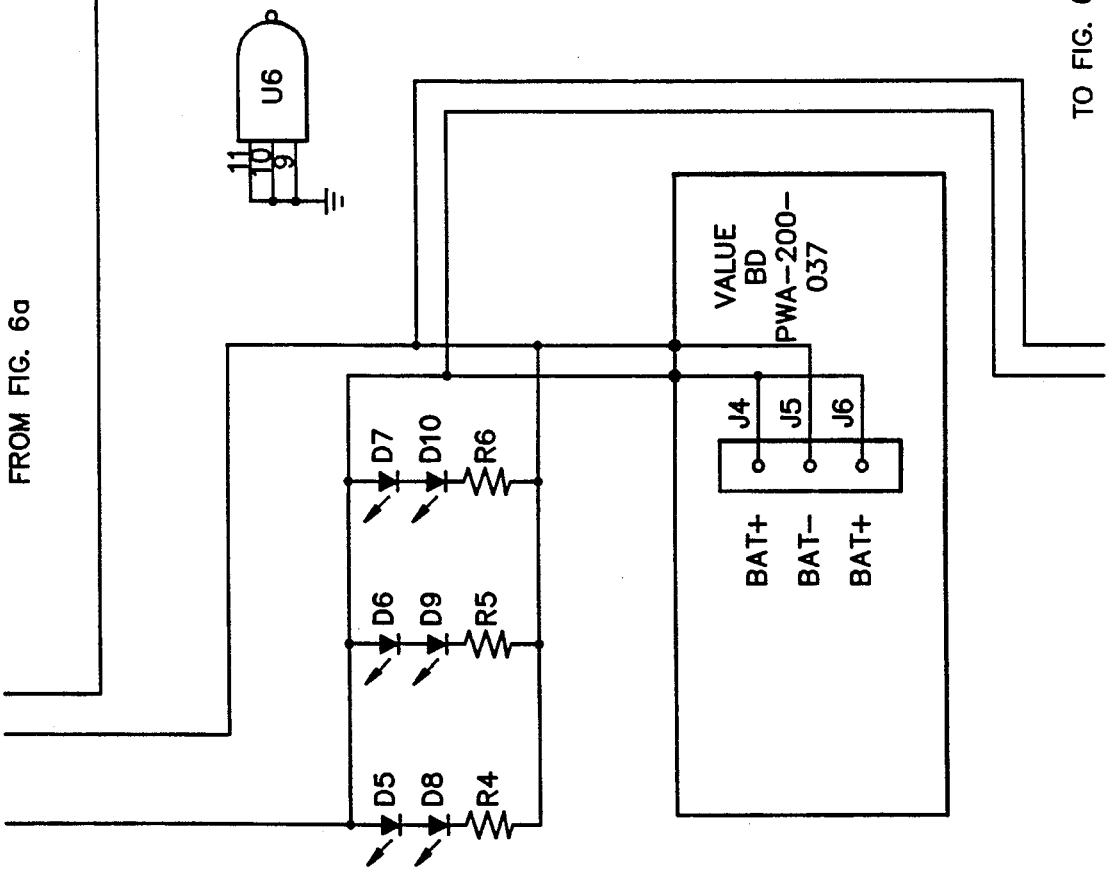
Figure 6D:
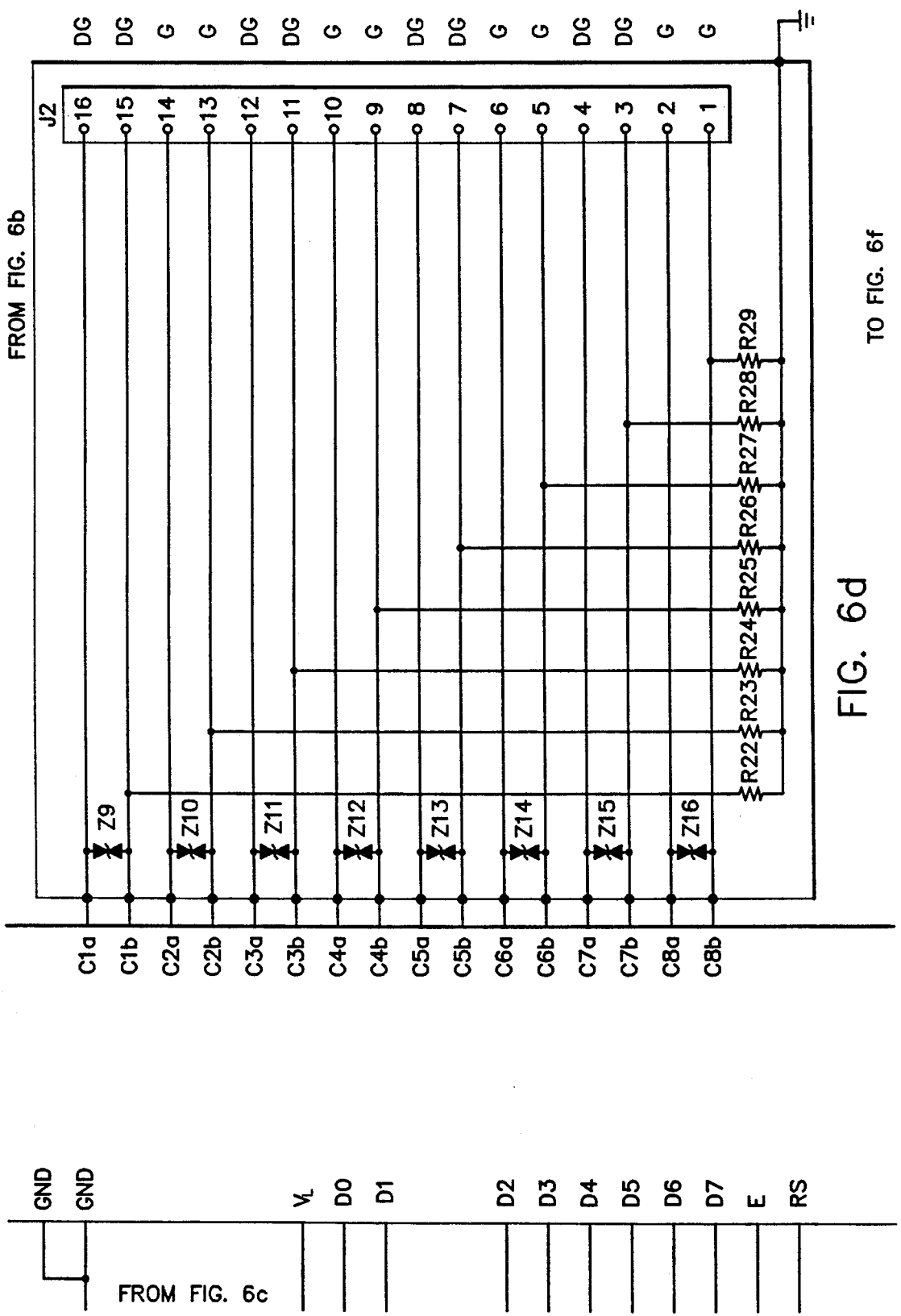
Figure 6E:
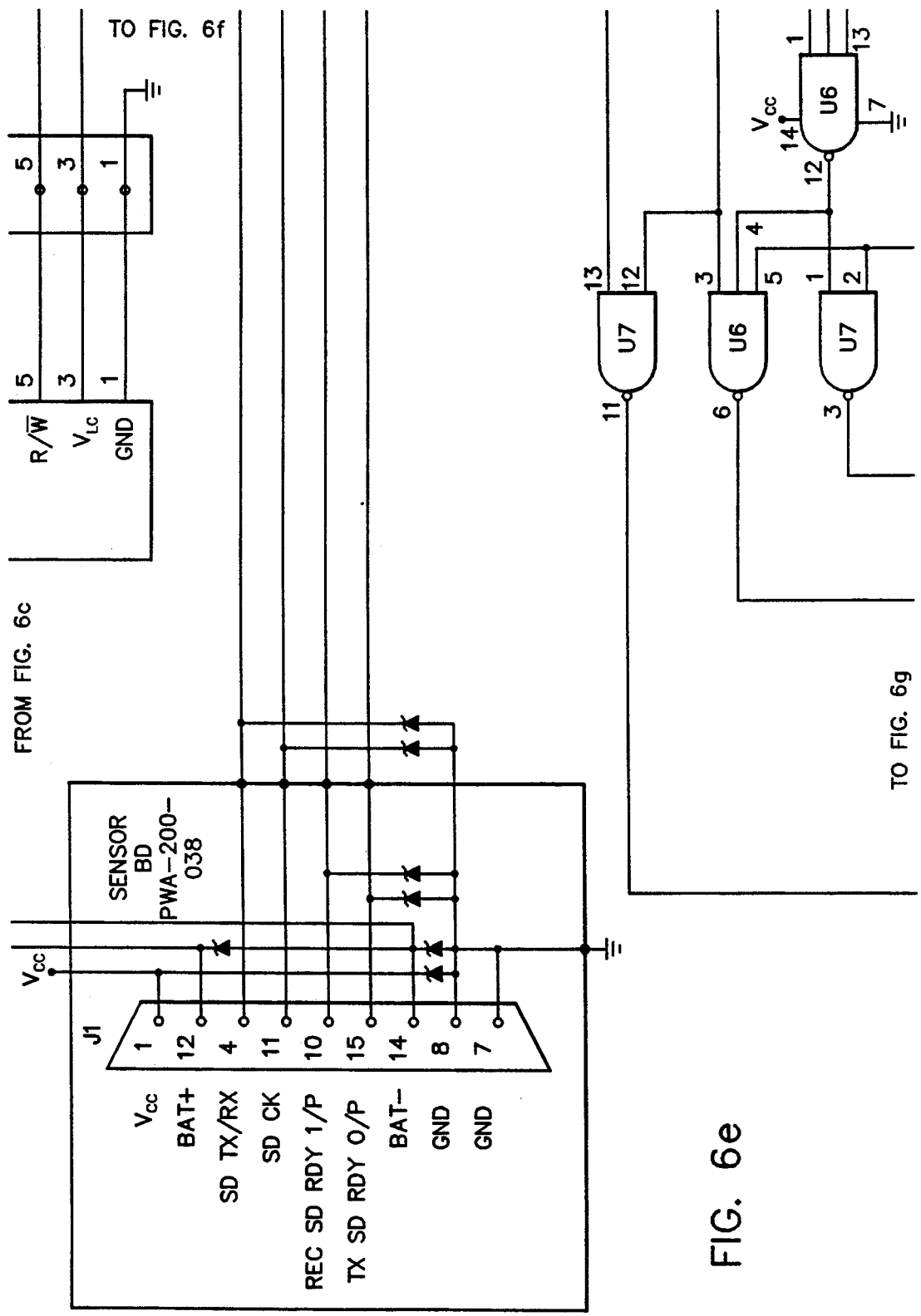
Figure 6F:
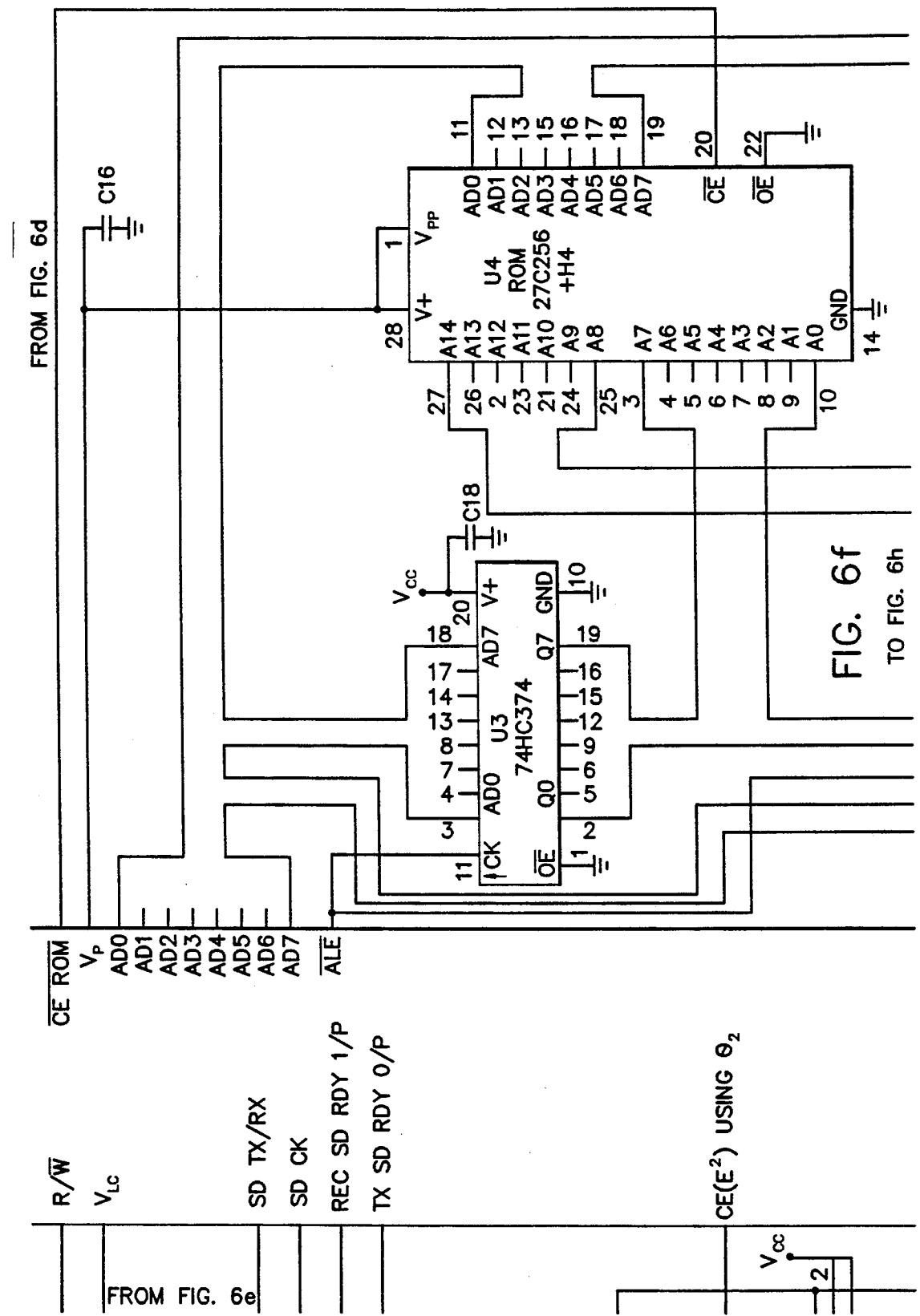
Figure 6G:
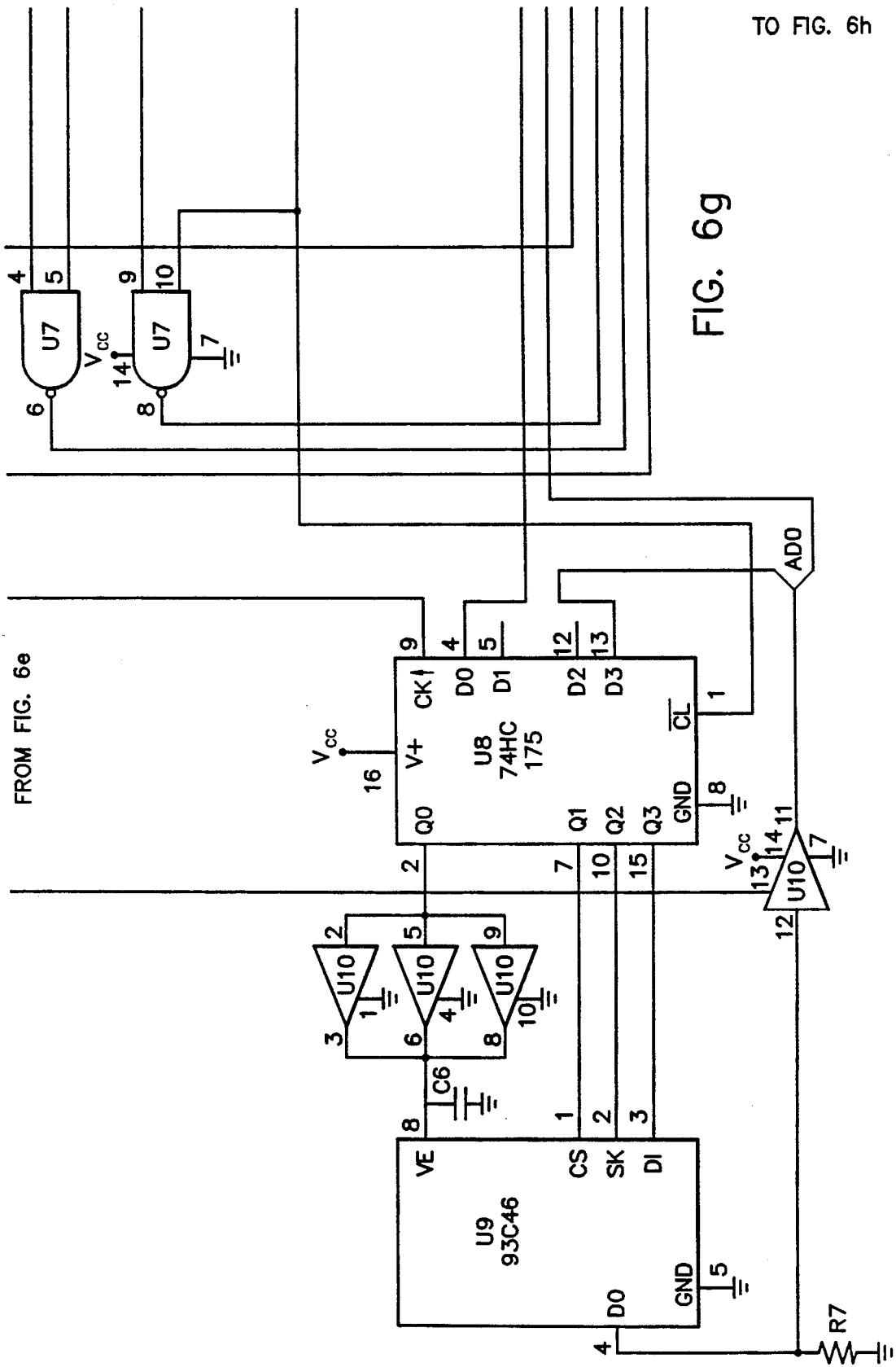
Figure 6H:
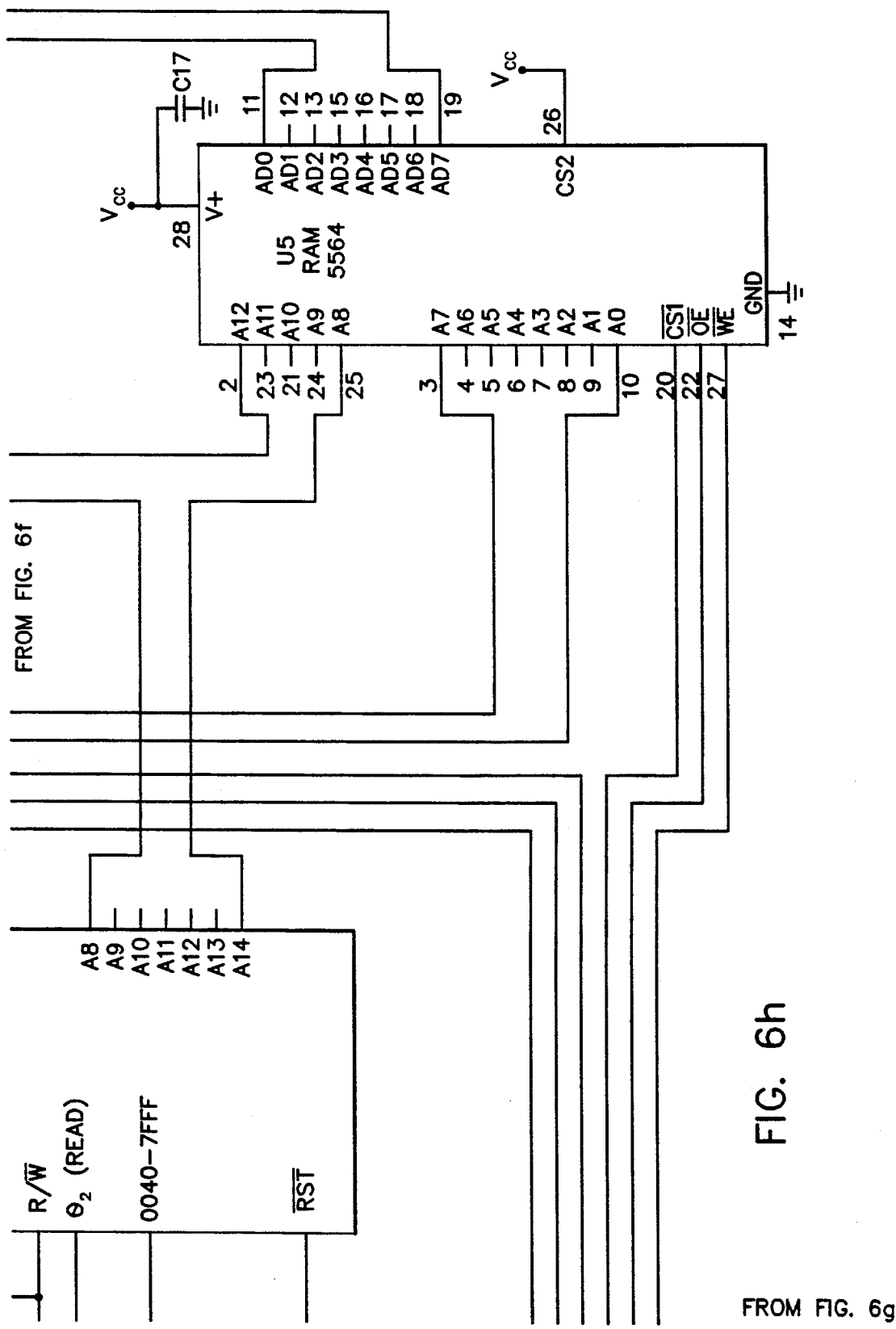
Figure 7:
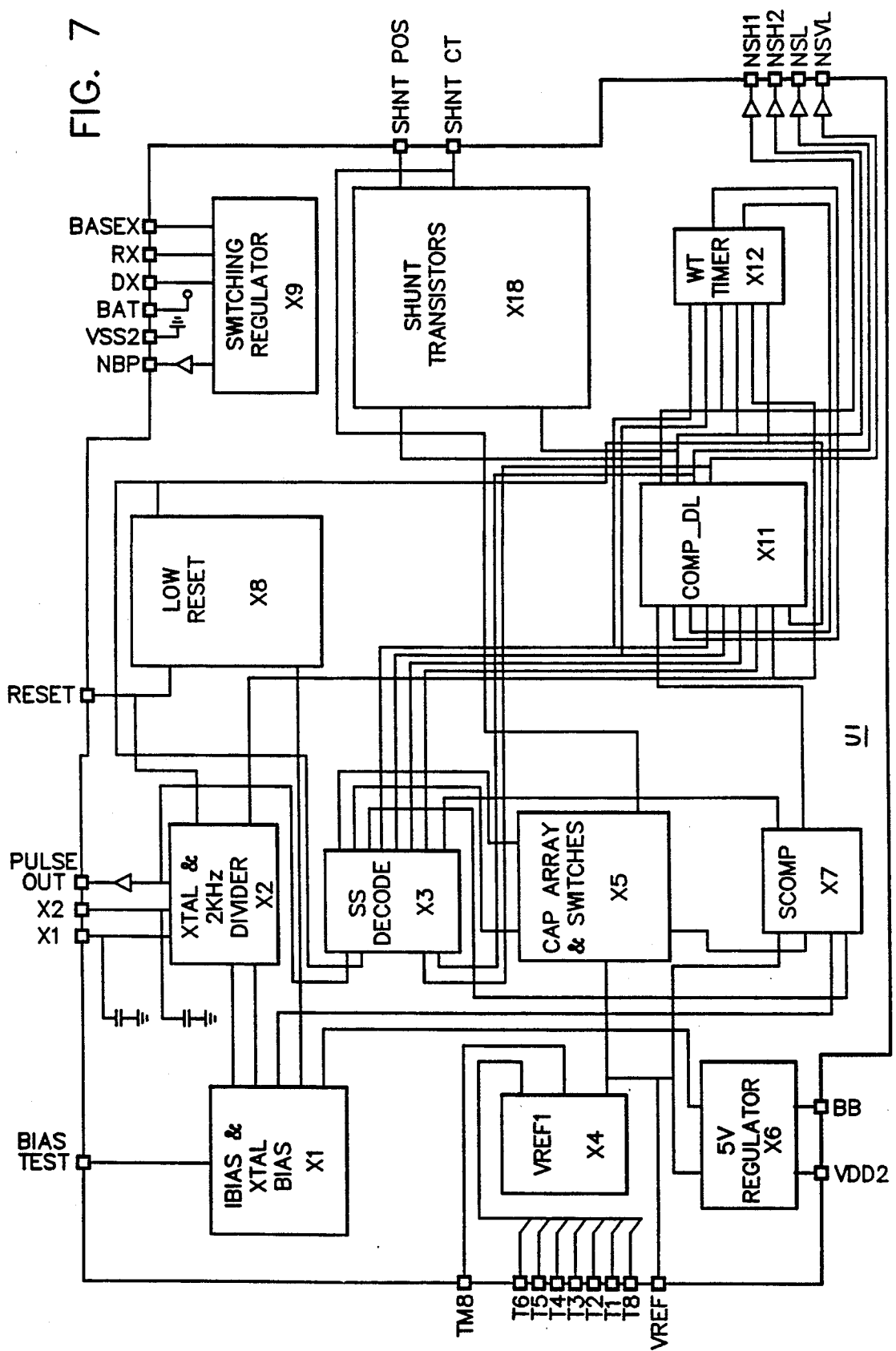
FIG. 7 is a block diagram of a first, U1, Application Specific Integrated Circuit (ASIC) used in the preferred second embodiment of the first power source within an irrigation controller in accordance with the present invention.
Figure 8A:
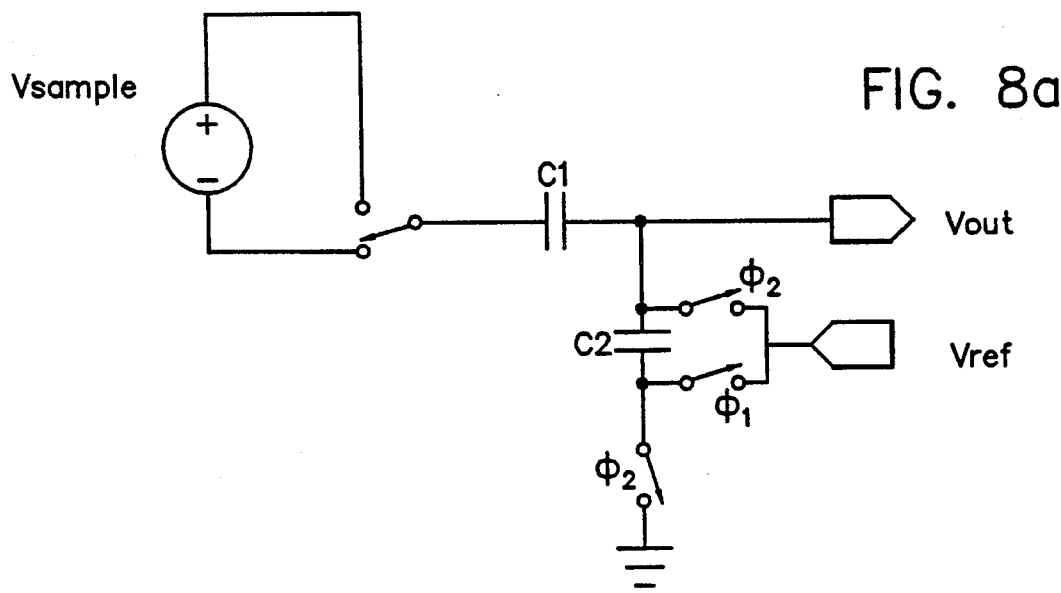
FIG. 8a is a simplified electrical schematic diagram of the sampling capacitor array and switches used in ASIC U1.
Figure 8B:
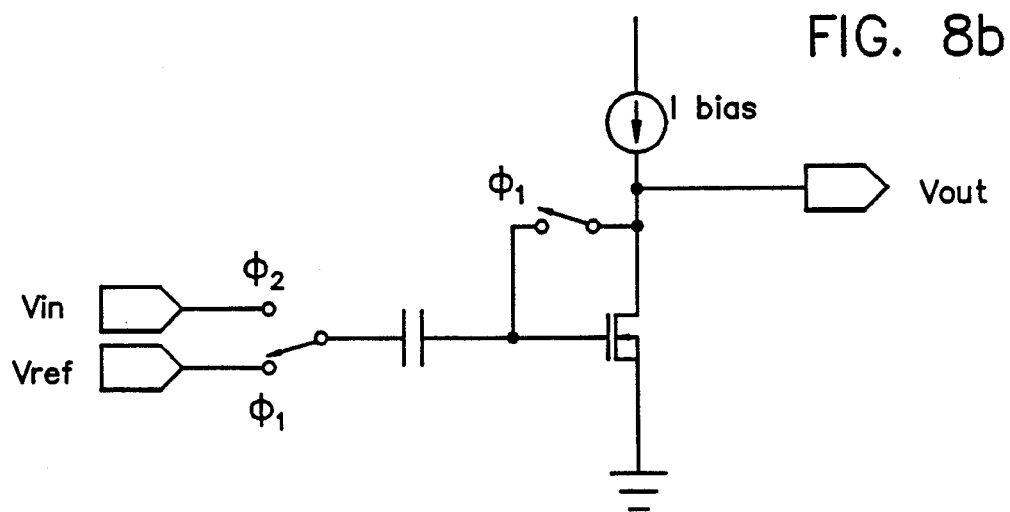
FIG. 8b is a simplified electrical schematic diagram of a sampling comparator used in ASIC U1.
Figure 8C:
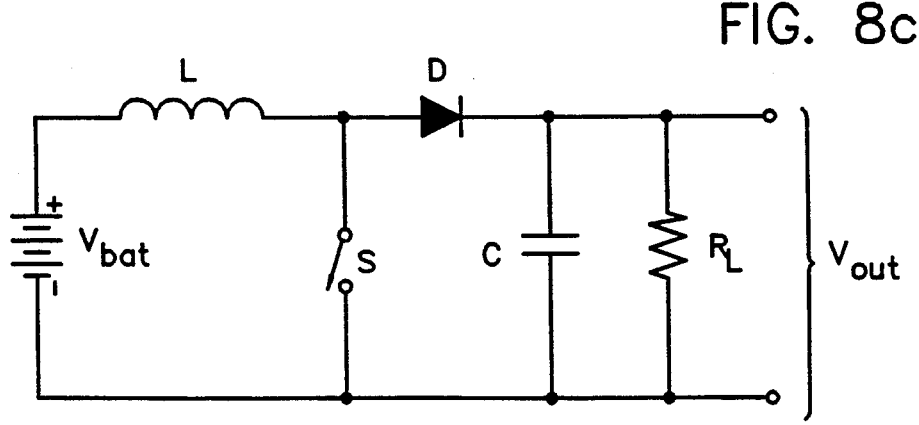
FIG. 8c is a simplified electrical schematic diagram of a step-up DC-to-DC Converter used in the switching regulator of ASIC U1.
Figure 9A:
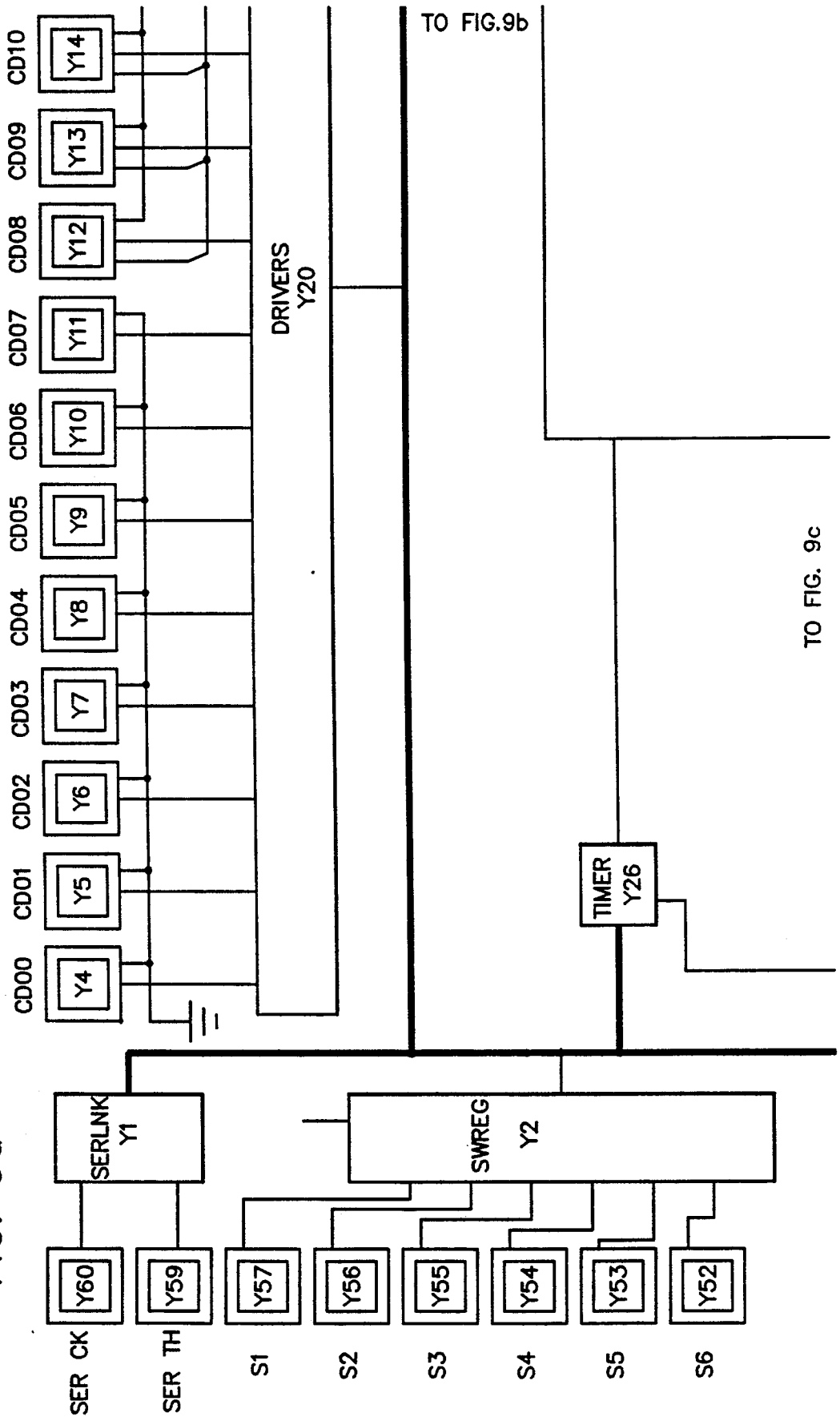
Figure 9C:
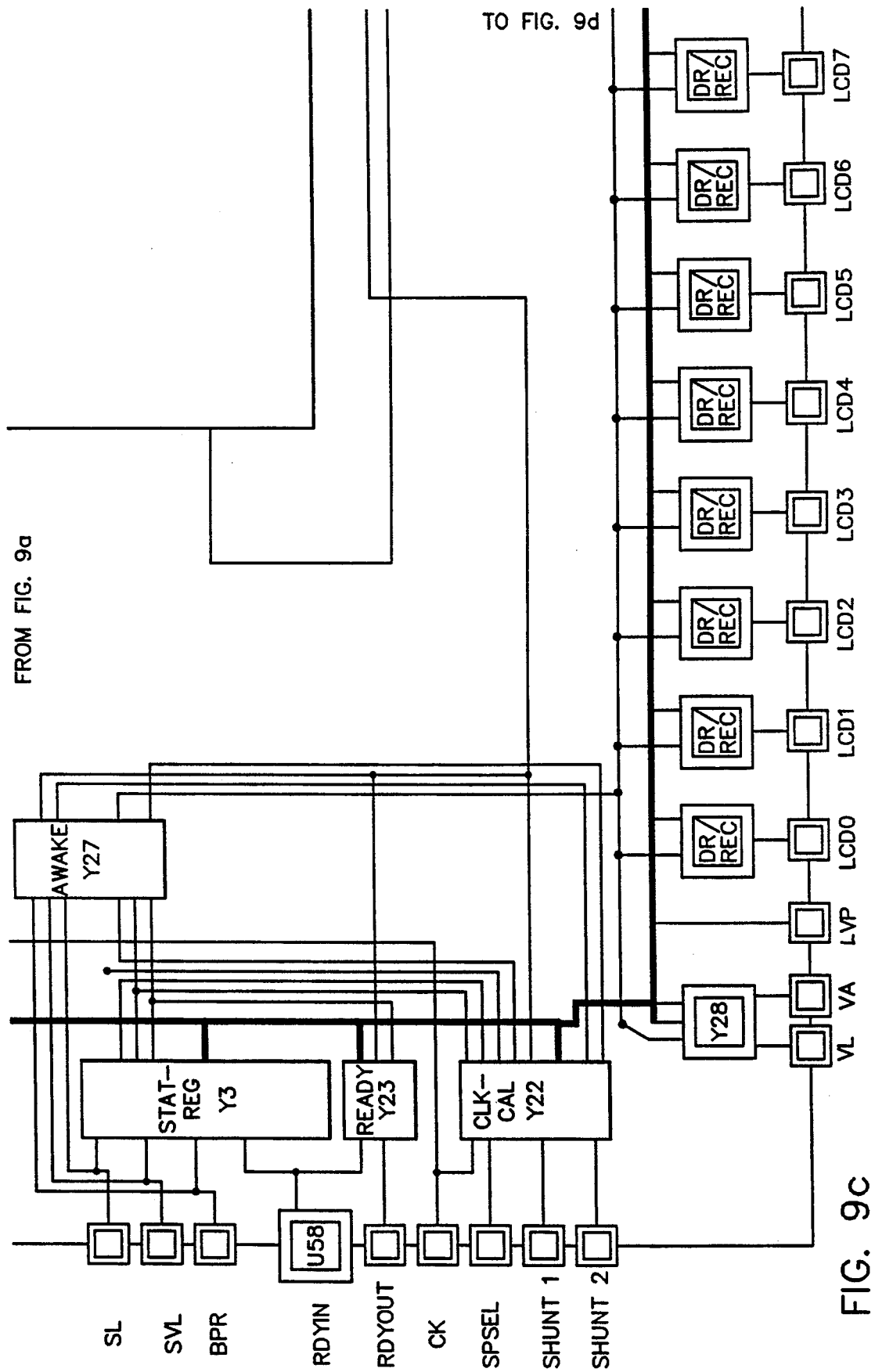
Figure 9D:
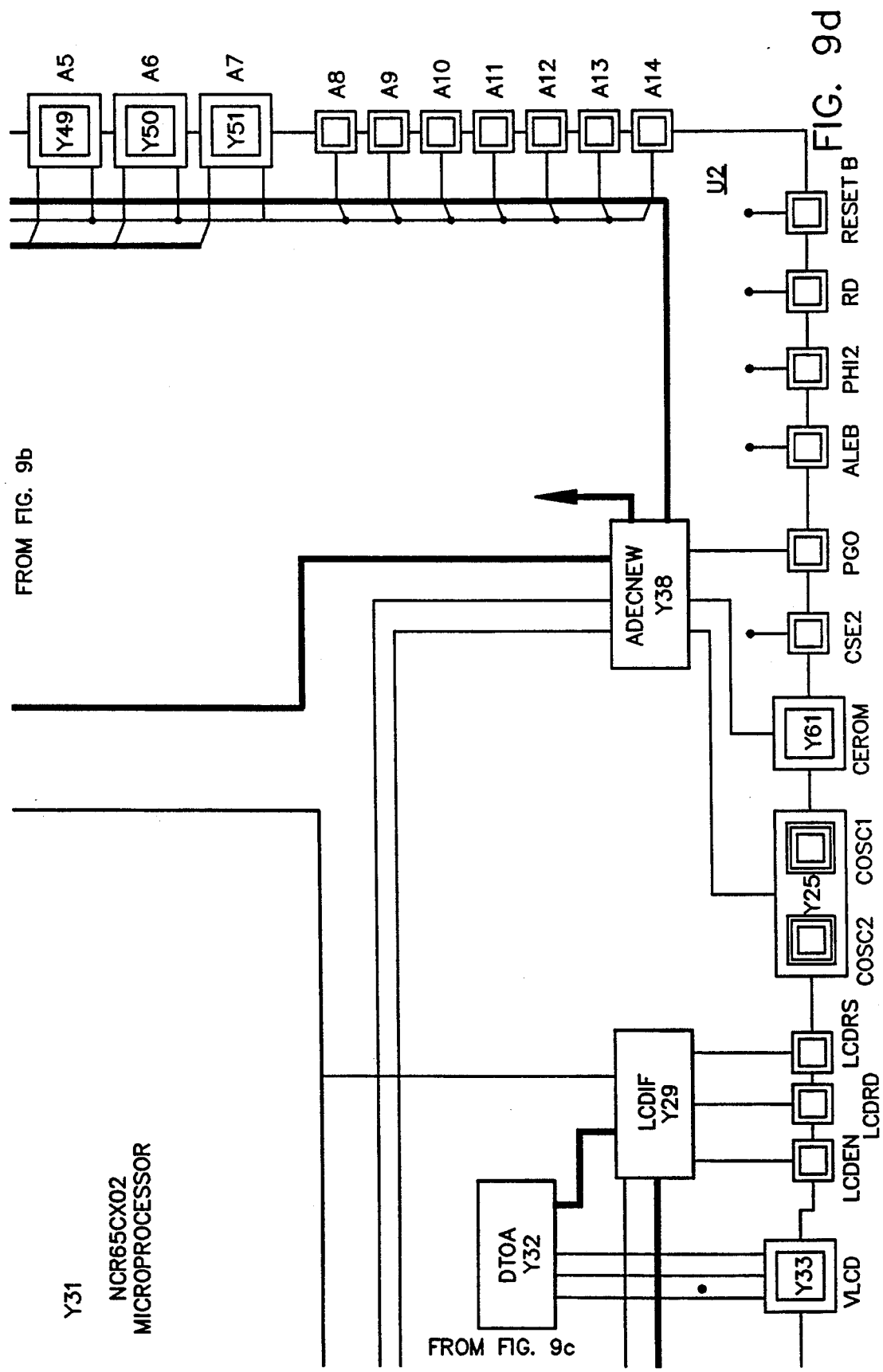

The current versus voltage response curve of either that embodiment of power source 1 shown in FIG. 4, or a preferred embodiment to be shown in FIGS. 6 and 7, is graphed in FIG. 5b. Each super capacitor exhibits an internal equivalent series resistance (ESR) of approximately 7 ohms. The maximum current in milliamperes that the collective 4 super capacitors can supply is graphed, on a times ten scale, versus the collective supply voltage. The supply voltage is maintained at 10.8 volts (derived from two super capacitors in series), which is the maximum power point on the curve of FIG. 5b At this voltage the first power source collective four super capacitors can source about 0.39 milliamperes.

3.0 Functional Description of the Preferred Embodiment of An Irrigation Controller in Accordance with the Present Invention A preferred embodiment of an irrigation control system in accordance with the present invention is shown in FIG. 2. An irrigation controller 1 (previously seen in FIG. 1) operates under control of MICROPROCESSOR U2 (partial) executing programmed firmware that is resident in memories types ROM U4, RAM U5, and EE U9. The MICROPROCESSOR U2 (partial) communicates with MANUALLY OPERABLE KEYS 22-25 (previously seen in FIG. 1) for receipt of data and control. It interfaces with DISPLAY 21 (previously seen in FIG. 21) for the display of questions, parameters, and help messages to a human user/programmer (as detailed in previous section 2.0).

The MICROPROCESSOR U2 (partial) of irrigation controller 1 optionally communicates externally through a SENSOR INTERFACE 26 of plugjack 16 (shown in FIG. 1) to up to eight MOISTURE SENSING UNITS (optional) 27a-27h (shown in phantom line). This optional communication is the purpose of sensing soil moisture at up to eight locations. The MICROPROCESSOR U2 (partial) communicates through VALVE INTERFACE 28 of plugjack 13 (shown in FIG. 1) to up to eight electromagnetically actuated CONTROL VALVES 29a-29h (shown in dashed lines). This communication is for the purpose of gating the flow of pressurized water from WATER SUPPLY 30 through a selected one of CONTROL VALVES 29a-29h at any one time to a corresponding one of WATERING HEADS 31a-31h (shown in dashed line).

The MICROPROCESSOR U2 (partial) may optionally communicate through plugjack 15 (shown in FIG. 1) to OTHER DEVICES 32 (shown in phantom line) for purposes of receiving the download of firmware programs, parameters, and/or commands. This interface need not be enable to operate the irrigation controller 1, which in preferred embodiment comes from the factory with that control program that is appendicized to this specification within its ROM memory U4 and EE memory U9, and which in the preferred embodiment may have all necessary parameters and control entered through MANUALLY OPERABLE KEYS 22-25. Indeed, if necessary firmware could be entered into controller 1 through it's MANUALLY OPERABLE KEYS 22-25. The digital interface to OTHER DEVICES 32 simply represents a less fedious way of communicating.

The preferred embodiment of the controller 1 normally derives all its power, and all power for MOISTURE SENSING UNITS 27a-27h and CONTROL VALUES 29a-29h, during quiescent operation both day and night from radiant light energy impingent upon RADIANT ENERGY CONVERTING UNIT (includes ASIC U1) that comprises each of PVM1, U1, and ASSOCIATED CIRCUITRY. "PVM" stands for photovoltaic module and "ASIC" stands for application specific integrated circuits. All "U" designations stand for integrated circuit chips that may be referenced in FIG. 3 (to be discussed).

The preferred embodiment of controller 1 is powered during its operation to accept user programming not by the RADIANT ENERGY CONVERTING UNIT PVMI, U1, and ASSOCIATED circuitry but rather by electrical connection through plugjack 14 (shown in FIG. 1) to the POWERKEY TM PLUGGABLE BATTERY ENERGY SOURCE 33. This SOURCE 33, normally not a part of irrigation controller 1 during its quiescent operation, is shown neither in shadow line for being optional, nor in dashed line for being related to the controller 1 of the present invention but not part thereof. Rather, the POWERKEY TM PLUGGABLE BATTERY ENERGY SOURCE is shown in solid line in order to illustrate that for the purposes of programming the controller in accordance with the present invention it must be present.

This required presence is because the SOURCE 33 supplies the greater power that the MICROPROCESSOR U2 (partial) needs to exit the predominantly somulent (inactive) state that it only intermittently and momentarily leaves to effect irrigation control in accordance with the schedules, and to assume a high duty cycle at operation. The SOURCE 33 also supplies the power requirements of MANUALLY OPERABLE KEYS 22-25 and of DISPLAY 21 during user programming. Although the energy storage within the RADIANT ENERGY CONVERTING UNIT might suffice to permit user programming, it is unwise to deplete this energy storage to an undetermined amount (dependent on the length and adeptness of user programming)—especially at night when no energy recovery is possible and especially when the controller is programmed to immediately begin controlling irrigation cycles. Instead, the SOURCE 33 actually charges the energy storage means within the RADIANT ENERGY CONVERTING UNIT, and always leaves the controller 1 fully powered and ready to control irrigation of the end of a user programming sequence.

3.1 Hardware Description of the Preferred Embodiment of An Irrigation Controller in Accordance with the Present Invention The schematic diagram of FIG. 6a through FIG. 6h,—substantially a block diagram because the very substantial function of the circuit shown is contained in two Application Specific Integrated Circuits (ASICs) U1 (shown in FIG. 4) and U2 (shown in FIGS. 9a-9d)—shows the preferred embodiment of irrigation controller 1 (previously seen in FIGS. 1 and 2) in accordance with the present invention.

Commencing in FIGS. 6a and 6c, primary power is provided to the irrigation controller in accordance with the present invention by photovoltaic module PVM 1 or, alternatively, by a POWERKEY TM power source. The POWERKEY TM power source is a battery that is connected between terminals BAT+ and BAT−. During programming of the irrigation controller 1 the POWERKEY TM power source (not shown) is always connected. Thereby the battery provides the considerable power necessary to energize the display LCD 1, and, importantly, operate the entire controller 1 at the high duty cycle necessary to conduct communications with the operator. The battery also serves to initially charge the capacitor power storage (both at a current limited rate) each time the POWERKEY TM battery power source is replugged to its receptacle 14 (shown in FIGS. 1 and 2). This insures that after each user interface communication the controller is always left in a fully charged condition.

During normal, quiescent, operation all low-power CMOS circuitry and the low-power valves are energized by energy stored in supercapacitors (SUPERCAPS) SC1, SC2. It is the function of first ASIC U1 to manage the voltage and power levels of the irrigation controller, and, most particularly, to control the charging of SUPERCAP SC1, SC2 by PVM 1 and the POWERKEY TM power source. The SUPERCAPS SC1, SC2 will automatically be charged by connection of the POWERKEY TM power source. The ASIC U1 operates to control this charging through a constant current source implemented by transistors Q3, Q4 and resistor R2. This constant current source is controlled by a switching regulator implemented from transistor Q2, inductance L1, diode D4, and capacitors C3, C4, all under the control of ASIC U1. The switching regulator and constant current source act jointly to pass, during the presence of bright sunshine or of the POWERKEY TM power source, up to 63 milliamperes through steering diode D3 to charge SUPERCAPS SC1, SC2. The diodes D1, D2 prevent discharge of the charged SUPERCAPS SC1, SC2.

Continuing in FIG. 6a, connections to the ASIC U1 that is used for power management and control include VDD 2. VDD 2 is the main +5 vdc power for the irrigation controller 1 and other components (such as CONTROL VALVES 29a-29h or MOISTURE SENSING UNITS 27a-27h both shown in FIG. 2) to which it is attached in order to form an irrigation system. Signals BA and DX provide local control to the switching regulator and constant current source. The abbreviation NSL stands for system low voltage, NSVL stands for system very low voltage, NSH1 stands for the first shunt from the upper SUPERCAP, NSH2 stands for the second shunt from the lower SUPERCAP, and NBP produces a battery present control signal. The output PULSE is a real time clock interrupt of 30 microseconds duration occurring each ½ millisecond.

The logical control function of the irrigation controller 1 is substantially implemented, by digital ASIC U2, shown extending across each of FIGS. 6b, 6d, 6f, and 6h. The main switch control inputs S1-S6 to ASIC U2, used for operator programming of the irrigation controller 1, are from corresponding switches S1-S6 shown in FIG. 6a. The switches S1-S6 respectively implement the stop, unused, unused, help, no, and ok switch control inputs to ASIC U2. These switches S1-S6 are called the MANUALLY OPERABLE KEYS 22-25 in FIG. 2.

Referring to FIGS. 3b and 6d, up to eight soil moisture sensors that are connectable to terminal block J3 produce signals that are received into corresponding eight analog to digital converter channels, AD CH1 through AD CH8, of ASIC U2.

In a similar manner one side of each coil driver of up to eight valves that are hooked to the eight valve channels on terminal block J2 is internally connected within ASIC U2 as a signal input to one of the remaining eight analog to digital converter channels. Thus, ASIC U2 offers a total of 16 A/D channels, of which eight are internal and eight are external. The irrigation valve control, or drive, signals developed by ASIC U2 are brought to terminal block J2. This terminal block J2 is brought out to plugjack 13 shown in FIGS. 1 and 2.

Referencing FIGS. 6f and 2h the ASIC U2 operates on firmware instructions, and on parameters, that are stored within both read only memory ROM U4 and in random access memory RAM U5. The ASIC U2 addresses both such memories through ADDRESS DECODER U7. The irrigation controller 1 is generally versatilely programmable, as well as parameterizable. Thus, many firmware instructions that ASIC U2 executes are present in RAM U5 and are loaded therein in accordance with user requirements. Other firmware instructions reside in ROM U4.

Referencing FIG. 6g, the irrigation controller 1 in accordance with the present invention connects to still another programmable memory other than RAM U5 (shown in FIG. 6h). This is Electrically Erasable (EE) 1024 bit serial memory U9. This EE memory is particularly distinguished in that it will retain its informational contents in the total absence of power (unlike RAM U5). Yet it is alterable in its contents, unlike non-votile ROM U4. The 1024 bit serial memory U9 permits the field programming of secret codes, vital set up information, and other information that is desirably user specified (unlike the factory-programmed informational contents of ROM U4), wherein this information will desirably not be lost during any interruption of power to the controller.

The complete firmware program, which is resident in memories U4, U5 and U9 and which is executed by the microprocessor contained in ASIC U2, is attached to this specification as Appendix A.

Circuits U6 (save for one unused spare gate shown in FIG. 6g), U7, and U8 form a control interface of a standard type from ASIC U2 to the 1024 bit serial EE memory U9. In the address bus between the ASIC U2 and the control interface circuit U8, address line AD0 powers up, address line AD1 selects, and address line AD2 clocks serial data present on line AD3 into, 1024 bit memory U9. The single, serial, data output bit D0 of 1024 bit memory U9 is amplified in non-inverting element U10 and communicated to ASIC U2 as bit ADO upon its address bus.

The function of the circuits of irrigation controller 1, substantially contained in ASIC U1 and U2, to manage irrigation control will become increasingly clear upon the detailed discussion of such ASIC U1s and U2 in respective following sections 4 and 5, and by reference to the complete firmware program attached to the present specification as Appendix A.

4.0 Functional Description of the U1 ASIC Device

The block diagram of FIGS. 7 and 8a-8c show the overall architecture of the first, U1, Application Specific Integrated Circuit (ASIC) used within the preferred embodiment of the irrigation controller in accordance with the present invention. The detail function of ASIC U1 is essentially unimportant for the purposes of the present invention, and is included within this specification only for purposes of completeness. The photovoltaic module (PVM, shown in FIGS. 3 and 4a) SUPERCAPS SCI and SCR (shown in FIG. 3) and ASIC U1 (shown in FIG. 2) may be considered to simply be the implementation of a special form of a light-energized power supply. The general implementation of an a.c. or battery source power supply is, of course, routine in the electrical arts.

The U1 ASIC device is used to generate a 5 volt power supply using power from a photovoltaic module or battery. Power is stored by charging very large supercapacitors ("SUPERCAPS") to 10.8 volts. The stored energy is then used for operation during dark periods. Because the energy stored in the SUPER- CAPS=½CV$_{cap}^2$, the run time duration of the controller during conditions of darkness is greatly affected by how closely the maximum charge voltage can be brought to the maximum tolerable voltage for the SUPERCAP components. Therefore, to increase the dark run time, the "SUPERCAPS" are very carefully monitored, so that they may be charged to a maximum value without being over-charged.

The U1 ASIC device is designed to use minimal power while providing five (5) functions:

First, it monitors SUPERCAP voltages and shunts the charging current if they are over-charged. The monitoring holds this voltage to within ±1.75%.

Second, it provides a 5 volt ±2.5%, 0–65 mA output voltage to power other electronics.

Third, it provides status signals indicating the condition of the power supply.

Fourth, it provides a 2 kHz, 30 us pulse for use as a time base.

Fifth, it steps up a 9 volt battery to 17 volts to charge the SUPERCAPS and provide current during programming of other electronics. (Power consumption is less of a concern in this mode.)

Sampling capacitors are used to monitor the various capacitor and power supply voltages, allowing the use of only one comparator to conserve current. CrSi 100 kΩ/ resistors are used to minimize analog currents.

The voltage reference is trimmed using on-chip metal fuses.

There are 3 potential 'most positive' voltages and two potential 'most negative' voltages, making substrate connections difficult. This is handled by using bipolar junction isolation that employs the isolated n- regions as separate CMOS substrates. This allows the CMOS circuitry to operate from several supplies, any one of which could be at the highest potential at different times.

The logic generally runs from VSS1 (0V) to VDD2 (0–5 V), level shifting where required. Analog references run from VSS1 to VDD1 (0–11 V). Switching regulator components run from VSS2 (−0.7 to +5.5 V) to VBAT (0 to 15 V). The upper shunt transistor is connected to a voltage which can range from 0 to VDD1 +0.7V.

4.1 VREF1 Voltage Reference

The VREF1 circuit X4 is a voltage reference for monitoring supercaps, system low, and system very low. The circuit requires no op-amps, reducing offset error. NMOS transistors at collectors of non bandgap transistors are used to eliminate early voltage effects. The circuit has a buffered output which multiplies the bandgap on-chip metal fuses. The trim range is approximately 1.5±/0.1 volts with minimum steps of 3 mV. An extra ±/−1 LSB is provided in case original trim is incorrect. The circuit temperature coefficient is 60 ppm/°C. typical, 150 ppm/°C. worst case.

4.2 IBIAS and XTAL BIAS Bias Current Generator

The IBIAS and XTAL BIAS circuit X1 generates 20 nA bias currents for other cells, and 100 nA bias (voltage) for xtal oscillator. It generates buffered 2 Vth voltage "VLOW" used to run the xtal oscillator and high-order dividers at low current. CrSi and p-resistors are combined to match TC of Vbe. The bias varies approximately ±28% over all parameters.

4.3 XTAL OSC and HIGH ORDER DIVIDERS

The XTAL and 2 kHz DIVIDERS circuit X2 generates a clock for capacitor switch sequencing. It uses a low current oscillator (CASCI from TCJ) running from the second Vth supply voltage called VLOW. Internal trim capacitors are added to the crystal pins and are metal mask trimmable. Dividers to 2 kHz run from VLOW, then are level shifted to VSSI, VDD2 (0 to 5V). This avoids level shifting at 32 kHz, conserving current.

Circuit input PULSE receives a 2 kHz 30 microsecond pulse used for on and off chip timing. Circuit input NSTROBE receives a 2 kHz, 15 us negative pulse occurring 60 us after PULSE and is used for on chip timing. The level shifters use approx. 30 nA each at 2 kHz.

4.4 SAMPLING SWITCH DECODE

The SS DECODE circuit X3 is clocked by input PULSE. A one-shot is used to effectively generate a non-overlapped clock for the switch output signals. All switch signals are disabled (by inputs E and NE) for 0.6 to 4 us after each clock.

Switch sequencing samples the upper supercap, lower supercap, system low, and system very low in that order. Inputs NSC1, NSC2, NSSL, NSSVL define which voltage is being sampled. Each voltage is sampled once every 7.8 ms.

Input NCMP_CLK is the comparator clock. Input NCMP_ON powers down the comparator during unused periods.

4.5 SAMPLING CAP ARRAY and SWITCHES

The CAP ARRAY and SWITCHES circuit X5 contains sampling capacitors that are basically unit sizes. Due to the variety of voltages sampled, fractions of units are required. Poly etch tolerance can cause approximately 0.2% ratio error.

Inputs S1, S2, S3, S8 and S9 require signals level shifted above VSS2 (the normal logic level is VSS1, VDD2). Inputs S1, S2, S3, S8, S9 must save bodies tied to VSSI and VDD1. All other switches may be tied to VSSI, VDD2. Note that this includes p-channel bodies, since they are isolated from the substrate in this process.

Sampling occurs such that the node OUT should remain at the reference voltage level if the sampled voltage is at its exact trip point. This avoids parasitic capacitance effects at this high-impedance node.

100 mV of hysteresis is added to the SL and SVL tests by switching between two slightly different capacitor values.

A simplified electrical schematic of the CAP ARRAY and SWITCHES circuit X5 illustrating its function is shown in FIG. 5a. In operation, V$_{OUT}$=-V$_{REF}$ if V$_{SAMPLE}$· C1=V$_{REF}$· C2.

4.6 SAMPLING COMPARATOR

The SCOMP circuit X7 compares output from the capacitor array to the reference voltage. It is inherently offset compensated. It's response time is less than 25 us.

A simplified electrical schematic of the SCOMP circuit X7 illustrating its function is shown in FIG. 5b. Phase 1 shorts the n-channel so that its gate voltage moves to the voltage where it carries exactly the current source current. The input capacitor is shorted to VREF and stores the difference between this gate voltage and VREF. Phase 2 opens the n-channel and connects the capacitor to the input voltage. If the input voltage is different from the reference, the gate is forced higher or lower, pulling the output of the current source down or allowing the current source to pull up.

4.7 COMPARATOR DATA LATCHES

The COMP DL circuit X11 stores the output of the comparator in the latch corresponding to the voltage being tested. It is clocked by input NSTROBE.

4.8 WAIT TIMERS

The WT TIMER circuit X12 is used as a "timed hysteresis" when the SUPERCAP voltages are sampled.

When near the trip voltage, the capacitors will tend to be above the trip voltage when charging, and immediately fall below the trip voltage when the charging current is shunted away. This is due to approximately 7Ω internal resistance in the SUPERCAPS.

The SUPERCAPS are sampled every 7.8 ms, and under the above conditions would alternate charging-/discharging at a 50% duty cycle. A typical charge current of 20 mA would average 10 mA, while a typical load current is 12 mA continuous, resulting in a net energy loss. This would result in the capacitor charging to less than its maximum value by the internal I-R drop.

To avoid this situation, the comparator data latch is disabled for 3×7.8 ms after it comes out of a shunt mode. This results in a 3:1 charge to shunt ratio, ensuring that the net charge current is positive.

4.9 SHUNT TRANSISTORS

The SHUNT TRANSISTORS X10 shunt up to 70 mA away from the SUPERCAP when the maixmum voltage is exceeded. The SHUNT TRANSISTORS X10 have a resistance of approximately 3.5 Ω.

4.10 SWITCHING REGULATOR

The SWITCHING REGULATOR circuit X9 provides 17 volts from a 9 volt battery. The inductor shorting transistor of the circuit is off-chip (the IC is not required to handle the 17 volts).

Output NBP signals the VDD2, VSS1 logic when a battery is attached to the BAT, VSS2 terminals.

A simplified electrical schematic of a step-up DC-to-DC Converter circuit used in SWITCHING REGULATOR circuit X9 and illustrating its function is shown in FIG. 5c. When switch S is closed the battery voltage is applied across the inductor L. Charging current flows through the inductor, building up a magnetic field, increasing as the switch is held closed. While the switch is closed, the diode D is reverse biased (open circuit) and current is supplied to the load by the capacitor C. Until the switch is opened the inductor current will increase linearly to a maximum value determined by the battery voltage, inductor value, and the amount of time the switch is held closed ($I_{PEAK} = V_{BAT}/L \times T_{OH}$). When the switch is opened, the magnetic field collapses, and the energy stored in the magnetic field is converted into a discharge current which flows through the inductor in the same direction as the charging current. Because there is no path for current to flow through the switch, the current must flow through the diode to supply the load and charge the output capacitor.

If the switch is opened and closed repeatedly, at a rate much greater than the time constant of the output RC, then a constant DC voltage will be produced at the output.

4.10.1 SWITCHING REGULATOR BIAS

The internal bias of SWITCHING REGULATOR circuit X9 is used only for biasing switching regulator components. The bias is provided by a Standard 5 uA bias cell type A54020. Its absolute value is not critical.

4.10.2 VREF2

The SWITCHING REGULATOR circuit X9 has an internal reference for monitoring switching regulator output voltage. The reference is provided by a standard cell reference type A53000 that is modified to use CrSi.

The reference circuit is chosen to keep non collectors at positive voltage. (Switching regulator can have voltages below the substrate voltage VSS1.)

The value and temperature coefficient of the circuit are not critical, and trim is not required.

4.10.3 RC OSC

The SWITCHING REGULATOR circuit X9 has an internal clock for switching the regulator at approx. 25 kHz. The clock is divided from 50 kHz to give a 50% duty cycle. It employs a standard cell reference type A55010 that is modified for CrSi. An approximate 150 kΩ external resistor is required.

4.10.4 SWITCHING REGULATOR COMPARATOR

The SWITCHING REGULATOR circuit X9 has a comparator that uses positive feedback for an improved response time of 3.5 us maximum.

4.11 VREG

The 5V REGULATOR circuit X6 provides a 5 volt ±2.5% regulated output for external electronics as well as VDD2 for internal logic. An external NPN is used to avoid thermal effects on the IC.

4.12 LOW VOLTAGE RESET

The LOW RESET circuit X8 resets the entire U1 ASIC. The power supply can (under various light conditions) take minutes to hours for power up, which eliminates normal power-on-reset circuits. This circuit must ensure that all outputs are valid until the analog circuits are operational.

The output holds all latches in reset until the bias, reference, and regulator circuits are all running at levels acceptable for operation.

4.13 Preferred Technology for the U1 ASIC

The U1 ASIC is suitably implemented in BIPOLAR-CMOS technology available from several semiconductor foundaries. It is typically implemented in the BI-CMOS process of MicroRel Division of Medtronic, Inc., 2343 W. 10th Place, Tempe, Ariz. 85281.

5.0 FUNCTIONAL DESCRIPTION OF THE U2 ASIC DEVICE

The block diagram of FIG. 6, consisting of FIG. 6a through FIG. 6f, shows the overall architecture of the second, U2, Application Specific Integrated Circuit (ASIC) used within the preferred embodiment of the irrigation controller in accordance with the present invention.

The U2 ASIC device is concerned with calculation, command, and control. It is primarily digital in operation, and may be considered to be a specialized microprocessor with substantial analog as well as digital I/0 capabilities. The diagram of the U2 ASIC device shows the detailed interconnection of the various functional blocks.

5.1 U2 ASIC Device Architecture 5.1.1 Microprocessor

The central microprocessor Y31 of the U2 ASIC device is a NCR 65CX02 macrocell. It employs an 8-bit datapath structure controlled by an internal programmable logic array (PLA) using 8-bit instructions and having a 16-bit addressing capability. Importantly, all circuitry internal to the microprocessor is completely static and complementary so that the clock signal may be frozen and only leakage current will be consumed. It has a clock speed of 455 KHz and a 2.2 microsecond cycle time.

The microprocessor Y31 executes the instruction repertoire of commercially available microprocessor type 6502. The mnemonic codes for the instructions of this repertoire, such mnemonic codes as appear with the firmware program listing attached as Appendix A to this specification, are commonly recognized mnemonics, and a complete description of the microprocessor type 6502 instruction repertoire, are contained, among numerous other places, in the book "6502 Assembly Language Programming" by Lance A. Leventhal, published in 1979 by Osborne/McGraw Hill, 630 Bancroft Way, Berkeley, California 94710. It will be recognized that, consonant with the modest computational requirements of an irrigation controller, the relatively simple 6502 microprocessor macrocell is not the sole type that could be employed, and that many microprocessors including types commonly incorporated in ASICs are suitable for use within the irrigation controller in accordance with the present invention.

The firmware instructions executed by microprocessor Y31 occupy memory addresses in accordance with the following memory map table:

| | |
|---|---|
| 00-3F | I/O Parts |
| 40-7FFF | RAM Memory U5 (shown in FIG. 3h) |
| 8000-FFFF | ROM Memory U4 (shown in FIG. 3f) |

The operand fields of the firmware instructions are interpretable in accordance with the following memory map table:

| | | |
|---|---|---|
| 00 | O | Microprocessor power off |
| 01 | O | RTC counter clear |
| 02 | O | A/D power, 1=on, 0=off |
| 03 | O | A/D interface, 1=enable, 0=disable |
| 04 | O | LCD power, 1=on, 0=off |
| 05 | O | LCD interface, 1=enable, 0=disable |
| 06 | O | Valve select byte<br>bits 0-2 - valve #, + side<br>bits 3-5 - valve #, − side<br>bit 6 -polarity, 0=normal, |
| 1=reversed 07 | O | Valve enable, 1=on, 0=off |
| 08 | O | TIMER hi byte latch |
| 09 | O | TIMER lo byte latch |
| 0A | O | TIMER control, 1=on, 0=off |
| 0B | O | RTC, 1=10 seconds, 0=1 minute |
| 0C | O | Serial clock |
| 0D | O | TIMER load |
| 0E | O | Write serial data out |
| 0F | O | Serial output ready |
| 10 | I | RTC counter hi byte |
| 11 | I | RTC counter lo byte |
| 12 | I | Status register 1<br>bit 0 - 0=external battery present<br>bit 1 - 1=watchdog timeout<br>bit 2 - 0=system power low<br>bit 3 - 0=system power very low<br>bit 4 - o=RTC pulse<br>bit 5 - 1=battery low or caps charging<br>bit 6 - 1=serial data link present<br>bit 7 - 0=serial data link ready |
| 13 | I | Status register 2<br>bit 0 - Switch 1, 1=pressed STOP<br>bit 1 - Switch 2<br>bit 2 - Switch 3<br>bit 3 - Switch 4 HELP<br>bit 4 - Switch 5 NO<br>bit 5 - Switch 6 OK<br>bit 6 -<br>bit 7 - 0=A/D end of conversion |
| 14 | I | Read serial data in |
| 15 | I | Read A/D converter |
| 16 | I | Load serial shift register |
| 17 | I | Clear input ready latch |
| 18 | I | LCD busy flag & address counter (RS=0)<br>bit 7 - 1=busy |
| | O | LCD instruction register (RS=0) |
| 19 | I | LCD read data (RS=1) |
| | O | LCD write data (RS=1) |
| 1A | O | LCD contrast select (0-7) |
| 1B | O | Clear watchdog timer |
| 1C | O | Clock RTC counter |
| 1D | I/O | EEPROM |
| 1E | O | Coil test drivers |
| 1F | O | Sensor test drivers |
| 20 | O | Start A/D channel 0, sensor 1 |
| 21 | O | Start A/D channel 1, sensor 2 |
| 22 | O | Start A/D channel 2, sensor 3 |
| 23 | O | Start A/D channel 3, sensor 4 |
| 24 | O | Start A/D channel 4, sensor 5 |
| 25 | O | Start A/D channel 5, sensor 6 |
| 26 | O | Start A/D channel 6, sensor 7 |
| 27 | O | Start A/D channel 7, sensor 8 |
| 28 | O | Start A/D channel 8, valve 1 |
| 29 | O | Start A/D channel 9, valve 2 |
| 2A | O | Start A/D channel 10, valve 3 |
| 2B | O | Start A/D channel 11, valve 4 |
| 2C | O | Start A/D channel 12, valve 5 |
| 2D | O | Start A/D channel 13, valve 6 |
| 2E | O | Start A/D channel 14, valve 7 |
| 2F | O | Start A/D channel 15, valve 8 |
| 30-3F | | |
| 40-FF | | Zero page variables, pointers, and tables |
| 100-1FF | | Stack |
| 200-3FF | | Program variables |
| 8000 | | ROM start |
| FFFA-FFFB | | NMI vector |
| FFFC-FFFD | | RESET vector |
| FFFE-FFFF | | IRQ vector |

5.1.2 Drivers

The coil drivers Y20 work in pairs to supply relatively large bidirectional current pulses to operate electromagnetically actuated valves. Only one pair of coil drivers is active at a time, as specified by the contents of the data bus. Additionally, the output (coil) drivers have the capability to sink a regulated current for testing and programming purposes.

5.1.3 Timer

The timer Y26 consists of two 8-bit latches on the data bus and a 16-bit down counter which is clocked at 2 kHz. Loading of the counter and latches is under the control of the processor. When the counter reaches zero, a processor interrupt is generated.

5.1.4 ADC

The Analog-to-digital converter Y43 receives signals from external sensors and from the valves, a total of 16 channels in all, which are converted to digital information and placed on the data bus. The selection of the channel to be digitized is made on the basis of the contents of the address bus. The converted data is expressed as an eight-bit fraction. For the eight channels originating at the sensors and for the eight channels originating at the coils, this fraction is the ratio of the input voltage to the full power supply. All 16 ADC inputs may be pulled to ground through a poly resistor and an n-channel switch which together constitute a nominal 330 ohm resistance. The resistors associated with the eight channels originating at the sensors are enabled individually (as determined by the contents of the data bus) upon command of the processor. The performance specifications of the Analog-to-digital (A/D) Converter are as follows:

| | | |
|---|---|---|
| a. | Resolution/Accuracy | — 8 bits ± one-half LSB for VIN = 1(Vd)<br>— 8 bits ± one LSB for VIN = 1/2 (Vd) |
| b. | Conversion Time | — $\frac{8}{f_{osc}} \times n$ where n = 8 or 9 |

-continued

| | | |
|---|---|---|
| | | depending upon whether the conversion is full scale or half scale. |
| c. | Operating Current | — 3 mA maximum |
| d. | Analog Reference | — Digital Supply Voltage (Vd) |
| e. | Analog Inputs (Vin) | — Each input voltage is ratio-Metric with the digital supply voltage (Vd) where: |
| | Vin for full scale | = 1/2 (Vd) for A/D channels 1 through 8 |
| | Vin for full scale | = 1 (Vd) for A/D channels 9 through 16 |

5.1.5 Clock/Calendar

This clock/calendar Y22 provides several timing functions. It generates a 2 second timing tick at 10 second or 1 minute intervals.

It keeps watch on the status of the programmer battery by generating a "Battery Low" status bit if either of two "Supercap Shunt" signals are absent for more than 64 second during programming activity.

It counts up to 65535 ticks while the processor is in a low voltage shutdown mode so as to provide calendar memory. The calendar contents may be placed on the data bus.

It maintains a 128 second dead-man timer which can generate a hardware reset if the processor fails.

5.1.6 Switch Register

The switch register Y2 acts as an interface between six external configuration switches and the data bus. An additional input is the end-of-conversion signal from the analog-to-digital converter.

5.1.7 Status Register

The status register Y3 makes the following internal flags available to the processor as data on the data bus: Battery Present, Dead-man timeout, System Low, System Very Low, Real Time Clock Tick, Battery Low, Serial Data Link Present, and External Ready.

5.1.8 Serial Data Link

The serial data link Y1 provides high speed synchronous two-way communication between the device and a remote data transceiver. Data is loaded or retrieved via the data bus under control of the processor. Transmission of serial data is also directly controlled by the processor.

5.1.9 Ready

These circuits Y23 provide handshaking between the processor and an external device (such as a serial data link) through the status register and data bus.

5.5.10 Wakeup

The wakeup circuit Y27, upon stimulation by either the Serial Data Link Present or the clock/calendar time-tic or the Battery Present signals, starts the main system oscillator and then after a 500 microsecond delay, removes the system reset. Upon stimulation by the System Very Low signal or by the processor, the wakeup circuit immediately causes the system to be reset. The dead-man timeout signal will cause a 30 microsecond reset pulse to occur at two second intervals until the processor resets it.

5.1.11 Main Oscillator

The main oscillator Y25 uses an external capacitor and a charge-discharge scheme to produce a high-speed clock for the processor. This oscillator can be shut down to conserve power. It will restart immediately upon command. The frequency of oscillations is determined by the size of the external capacitor. The relationship between capacitor size and frequency, as well as the frequency stability over changes in operating environment, may be tailored in consideration of the operational environment within which the irrigation controller is used.

5.1.12 LCD Interface

The LCD interface Y29 consists of a latch on the data bus and the control circuitry needed to operate an external liquid crystal display and the DAC. The LCD interface can be configured to function as the 6502 Data I/0 port. The interface is configured in this way only during a special test mode. Under processor control, a flip flop is set which alters the internal logic paths so that the LCD bus will be configured as a 6502 Data I/0 port. This special test feature allows the 6502 to be tested independently of the peripheral logic.

5.1.13 DAC

The four bit digital-to-analog converter Y32 provides a voltage, as specified by the contents of the data bus, through the LCD interface for contrast control of the external liquid crystal display.

The performance specification of the DAC are as follows:
  a. Resolution: 4 bits
  b. Accuracy: ±½ LSB for all voltage steps
  c. Vout = n(0.147) where $0 \leq n \leq 15$
  d. Io (min) = 500 uA sink for Vout = 0V ± 50 mV
  e. Vo (max) = ±50 mV for Io = 500 uA for the DAC setting D3 = D2 = D1 = D0 = 0

5.1.14 Address Decoding

The address decoder circuit Y38 uniquely maps all internal functions into page zero of the processor's memory space. The decoder produces timing and control signals for these internal circuits as well as for reading and writing of external memory.

5.1.15 Power Switching

The power switch circuit Y28 controls the power for the external ROM and display as well as the internal analog functions in order to conserve power and to permit the irrigation controller to enter a "sleep" mode.

5.1.16 Resistor Control

The resistor control circuit U42 permits reconfiguration of the sensor and coil interfaces to enable communication upon each of the A/D channel lines so that integrity of both valve coils and moisture elements may be self-tested. This is accomplished by selectively switching a low value resistor between the channel signal line and ground.

5.2 U2 ASIC Input/Output Description

5.2.1 CD0 - CD15 - Coil Driver Outputs

These pins operate in pairs, one pair at a time, when driving the coils of the electromagnetically actuated valves. One pin of the pair goes high while the other goes low in order to provide bidirectional current. Inactive coil driver pairs assume a high impedance state. When the coil is deenergized the driver circuitry must absorb the energy of the collapsing field. CD8–CD15 also function as analog inputs to the ADC. These pins have the additional capability of sinking a regulated current for testing and programming purposes.

5.2.2 ADC0-ADC15 Analog Inputs to the ADC

These pins provide information from the coils and sensors whose integrity the processor must evaluate. ADC8–ADC15 are shared with the 8 valve lines CD8–CD15. ADC0–ADC7 are shared with the 8 sensor lines. All these 166 lines have the capability of sinking a regulated current for testing purposes.

5.2.3 SL - System Low

An active low input indicates that the condition of the power supply is such that further operation will soon be impossible. The processor, upon receiving this signal, will immediately turn off all valves in anticipation of approaching shutdown.

5.2.4 SVL - System Very Low

An active low signal indicates that the condition of the power supply is such that further operation is impossible. Upon receiving this signal the processor will immediately go into hibernation. After approximately 100 milliseconds, a hardware system reset will occur independently of the processor.

5.2.5 SH0, SH1- Supercap Shunt Signals

If either of these signals persists in the high state for longer than 64 seconds, a Battery Low status will be generated.

5.2.6 BPR - Battery Present

An active low signal indicates that a battery is connected to the power supply so that the processor may run continuously.

5.2.7 S1-S6-Switch Inputs

Active high inputs with internal pulldowns go directly to the switch register.

5.2.8 A0-A14-Address Outputs

The external RAM and ROM are addressed by these pins. A0 - A7 in conjunction with ALE also functions as D0 - D7.

5.2.9 D0-D7- Bidirectional Data Bus

The external RAM and ROM use these lines for transferring data to and from the device. The lower address bits are multiplexed with the data on these lines in conjunction with the ALE signal.

5.2.10 ALE - Address Latch Enable

When this signal is high, data transfers may take place on the D0-D7 pins. When this signal is low, these same pins are used as A0-A7 outputs.

5.2.11 RDYIN - Ready Input

This signal appears as one of the bits of the status register. RDYIN provides handshaking protocol from a distant serial data link. A low-to-high transition of this signal sets the Serial Data Link Present status bit low. The signal is provided with an internal pulldown.

5.2.12 RDYOUT - Ready Output

This signal passes the contents of data bus bit zero out of the device under control of the processor to provide handshaking protocol to a distant serial data link.

5.2.13 CEROM - ROM Chip Enable

This signal is used to enable the outputs of the external ROM onto the D0-D7 pins.

5.2.14 LCD0 - LCD7 - Liquid Crystal Data

These bidirectional signals transfer data to and from the external liquid crystal display. They are provided with internal pulldowns.

5.2.15 LCDEN - LCD Enable

This output signal enables the external liquid crystal display. This output signal can be made to exhibit high impedance with an internal pulldown.

5.2.16 LCDRS LCD Register Select

This output signal informs the external LCD module that either data or command appears on the data inputs. This output signal can be made high impedance with an internal pulldown.

5.2.17 LCDRD - LCD Read

This output signal controls the direction of data flow to or from the external liquid crystal display. This output signal can be made to exhibit high impedance with an internal pulldown.

5.2.18 VLCD Analog Output From the DAC to the External Liquid Crystal Display

This analog output signal is used to control the display contrast.

5.2.19 VL - Switched Power to the External Liquid Crystal Display

When this signal is switched on it provides current from the device power input VDD. When it is switched off, it sinks current into the device power return VSS.

5.2.20 VA - Switched Power to the External Sensors

When this signal is switched on, it provides current from the device power input VDD. When it is switched off, it sinks current into the device power return VSS.

5.2.21 VP - Switched Power to the External ROM

When this signal is switched on, it provides current from the device power input VDD. When it is switched off, it sinks current into the device power return VSS.

5.2.22 Serial Clock - Clock Input/Output for Serial Data Transfer

When driven by the device for outward data transmission, this signal alternatively assumes a low impedance high state and a low impedance low state. If the low state persists for more than 20 to 40 nanoseconds then the signal remains at a high impedance with an internal pulldown. In this last state, the pin may be driven by an external source for inward data transfer (reception). The clocks generated by this pin may have a rate of up to 32,000 Hertz. This pin may be loaded with up to 300 picofarads capacitance.

5.2.23 Serial Data - Data Input/Output for Serial Data Transfer

When driven by the device for outward data transmission, this signal assumes a low impedance state whenever the Serial Clock is high, and then, if the clock low state persists for more than 20 to 40 nanoseconds, a high impedance with an internal pulldown. In this last state, the pin may be driven by an external source for inward data transfer (reception). The data generated by this pin may have a rate of up to 32,000 bits per second. This pin may be loaded with up to 300 picofarads.

5.2.24 C01, C02 - Capacitor Connections

Provides a connection for a capacitor whose value determines the frequency of the Main Oscillator.

5.2.25 READ (WRITENOT) - R/W Signal From the Processor

Indicates whether a memory read or memory write cycle is in progress.

5.2.26 PH12 - Processor Clock

This signal is high during the active portion of the processor's operation. When low, the processor is precharging its internal busses. This signal must logically combine with Read and the appropriate address decode to create the control signals to apply to external memory.

5.2.27 CSE2 - EEPROM Chip Select

This signal is used in conjunction with READ and PH12 for external EEPROM operations.

5.2.28 RSTB - Processor Reset

This active-low signal indicates that the processor is shut down and may be used to initialize external circuitry to the correct state for processor startup.

5.2.29 PAGE0 - Page Zero

This pin goes high when the address bus is in address area 0040H through 7FFFH inclusive.

5.2.30 VDD - Device positive supply.

5.2.31 VSS - Device negative supply.

5.2.32 CK - Real-Time Clock Input for Clock Calendar Timer

The frequency is nominally 2 Khz with a 30u second high-going pulse.

5.2.33 SPSEL

When SPSEL=1, the chip requires a 32 Khz time base on the CK input. When SPSEL=0, the chip requires a 2 Khz time base on the CK input.

5.3 ASIC U2 Power Supply Requirements

| Parameter | Symbol | Min | Max | Units |
|---|---|---|---|---|
| Power supply All circuitry active | VDD A | 4.5 | 5.5 | V |
| Power Supply Real time clock, interrupt, and battery low detection circuitry operative. All other circuits are at a static, defined logic level (therefore, not being clocked). | VDD B | 2.00 | 5.5 | V |
| Active Supply Current VDD = 5.5v, 2Khz Real time clock running, main oscillator running, processor, ADC, LCD interface login running (only), DAC running, coil drivers in high-impedance state, external interface circuitry to EEPROM, ROM and RAM is active, however, the active current of the EEPROM, ROM and RAM is not included. | Ia | | 6.0 | mA |
| Quiescent Supply Current VDD = 5.5v, Real time clock running, main oscillator stopped, processor stopped, coil drivers in high-impedance state, ADC, LCD, DAC are all powered off. External EEPROM and ROM are powered off. External RAM is at a static, defined logic level (therefore, not being clocked). The quiescent current of the RAM is not included in Iq. | Ia | | 1.5 | uA |

5.4 ASIC U2 Signal Pin Requirements

Unless otherwise stated, the following characteristics apply over the applicable operating power supply range as specified above. All pins are protected against electrostatic discharge.

| Parameter | Symbol | Min | Max | Unit |
|---|---|---|---|---|
| Capacitance of Inputs | Ci | | 10 | pF |
| Capacitance of Outputs | Co | | 10 | pF |
| Capacitance of Tristate | Ct | | 10 | pF |
| Input Leakage Current | Iil | −1 | +1 | uA |
| Tristate Leakage Current | Itl | −1 | +1 | uA |
| Passive Pulldown Current (@ Vih = VDD) | Ipd | −1 | −30 | uA |
| Active Pulldown Current (@ Vi = 2.5v) | Irpd | −4 | −12 | mA |
| VA, VL, VP | | | | |
| Output High Voltage | Voh | VDD−0.3 | VDD+0.3 | V |
| Output Low Voltage | Vol | −0.3 | +0.4 | V |
| Output High Current (@ Voh = VDD−0.3V) | Ioh | | −6.0 | mA |
| Output Low Current | Iol | | 6.0 | mA |
| VLCD | | | | |
| Output Voltage Range | Volcd | 0.0 | 2.2 | V |
| Output Current (@ Vol = 0.5V) | Ioled | +0.5 | | mA |
| Coil Driver Pins | | | | |
| Input Voltage Range | | See ADC8-ADC15 below | | |
| Output Pair Drop (@ I = 45mA, Vdd = 4.5v) | Vdr | 0.0 | 1.0 | V |
| ADC0-ADC15 | | | | |
| Input resistance | Rin | 10Meg | | ohm |
| Input Voltage Range | Vina | −0.0 | VDD | V |
| C01, C02 | | | | |
| Output High Voltage | Voh | 0.5 | VDD+0.3 | V |
| Output Low Voltage | Vol | −0.3 | 0.4 | V |
| Output High Current (@ Voh '2 2.5V) | Ioh | −4.0 | −12.0 | mA |
| Output Low Current (@ Vol = 0.4V) All Other Pins | Iol | | 4.0 | mA |
| Input High Voltage | Vih | 2.0 | VDD+0.3 | V |
| Input Low Voltage | Vil | −0.3 | 0.8 | V |
| Output High Voltage | Voh | VDD−0.5 | VDD+0.3 | V |
| Output Low Voltage | Vol | −0.3 | +0.4 | V |
| Output High Current (@ Voh − VDD−0.5V) | Ioh | −2.0 | | mA |
| Output Low Current (@ Vol = 4.0V) | Iol | | 4.0 | mA |

5.5 ASIC U2 Mechanical Characteristics

5.5.1 Package Requirements

The device is packaged in an 84-pin plastic leaded chip carrier. The package life exceeds 20 years

5.5.2 Environmental Requirements

The limits below represent the environmental limits to which the device will ordinarily be subjected.

| Rating | Value | Unit |
|---|---|---|
| Storage Temperature | −40 to +85 | deg C. |
| Operating Temperature | −10 to +70 | deg C. |
| Lead Temperature (4 min soldering) | 250 | deg C. |
| Humidity | 85/85 | deg C./percents |

5.6 Preferred Technology for Implementation of the U2 ASIC

The preferred embodiment of ASIC U2 is preferably implemented in the CMOS technology of NCR Corporation, Dayton, Ohio. This technology, and the design rules and standard cells therein, is discussed in the "NCR ASIC Data Book" for January 1987. The equivalent technologies of other manufacturers will be realized to be equally suitable. It will be understood that the irrigation system of FIG. 2 could also be implemented using standard integrated circuit and microprocessor components in combination with a control program corresponding to that of Appendix A. Such a system could be used alternately to implement the present method.

6.0 Variations and Adaptations of the Invention

Although the present invention has been taught in the context of electrical circuits that are fairly sophisticated for employing both a predominantly digital ASIC (ASIC U2), it should be understood that the functionality of the preferred embodiment of an irrigation controller in accordance with the present invention is readily realizable by diverse alternative designs.

In particular, the core microprocessor of the preferred embodiment of the invention is 100% compatible with industry standard type 6502. All firmware appended to this specification will execute on a 6502 microprocessor, and is readily convertible to alternative microinstruction repertoires executing on alternative microprocessors. The circuits by which data is manually input to the microprocessor and displayed, and the control of irrigation valves, are, in the preferred embodiment of the invention, powered and sequenced to states of activity in a highly unique manner. Nonetheless, it will be recognized that alternative implementations of these circuits, particularly as consume higher power and/or operate at higher or continuous duty cycles, are readily realizable by a practitioner of the electrical design arts. Accordingly, the present invention should be considered in terms of the functions that it performs, and not solely in terms of any particular embodiment for realizing these functions.

In particular, the energy production, storage, and consumption balances of the system may be changed without departing from the spirit of the invention. The photovoltaic module could be made larger to gather more light energy. The energy storage in super capacitors could be differentially sized. Finally, the energy consumption could be set higher, especially if the controller is to be used in sunny climates.

In accordance with these and other aspects and attributes of the present invention, the invention should be determined by the scope of the following claims, only, and not solely in accordance with those particular embodiments within which the invention has been taught.

What is claimed is:

1. An apparatus comprising:
  operational means for at times performing a function other than communication that consumes power at a first rate, and for at other times performing a communication function that consumes power at a second rate higher than the first rate;
  means for deriving electrical energy from radiant energy incident upon the apparatus;
  means for storing electrical energy, received from the means for deriving, sufficient so as to power the operational means at the first rate for the function other than communication;
  connection means for electrically connecting the operational means to an external source of power selectively during all such times as the operational means is performing the communication function;
  wiring means for constantly electrically connecting the operational means to the means for storing electrical energy;
  transportable power source means, electrically connected to the operational means by the connection means during all such times as the operational means is performing the communication function, for serving as the external source of power for powering the operational means at the relatively-higher second rate;
  wherein the powering of the operational means for the communication function by the transportable power source means permits that this communication function, which uses power at the relative-higher second rate, may transpire without substantial diminution of the energy stored in the means for storing energy.

2. The apparatus according to claim 1 wherein the means for storing comprises:
  a capacitor.

3. The apparatus according to claim 2 wherein the capacitor comprises:
  an electrolytic capacitor having at least one carbon paste electrode.

4. The apparatus according to claim 2 wherein the capacitor comprises:
  a large capacitance electric double layer capacitor storing charge at an interface by an electric field between one phase comprising an activated carbon particle and a second phase comprising sulfuric acid.

5. The apparatus according to claim 1 wherein the transportable power source means comprises:
  a battery.

6. The apparatus according to claim 1 adapted as an irrigation controller that at times performs as the function other than communication an irrigation control function that consumes power at the first rate, and that at other times performs the communication function that consumes power at the second rate in order to communicate with a user/programmer of the irrigation controller so that the user/programmer may direct the irrigation controller in the control of irrigation, the apparatus according to claim 1 so adopted wherein the operation means comprises:
  a microprocessor; wherein the means for deriving comprises:
  a photovoltaic device deriving electrical energy from light energy;
  wherein the means for storing comprises:
  a capacitor; wherein the connection means comprises:
  a pluggable electrical connector; and wherein the transportable power source means comprises:
  a battery.

7. The apparatus according to claim 1 wherein the transportable power source means is connected in electrical parallel with the means for storing by the connector means, and thus not only serves as the source of power to powering the operational means without substantial diminution of the power stored in the means for storing, but, because it is connected in electrical parallel with the means for storing by the connector means that at all times connects the means for storing to the operational means, actually replenishes power stored in the means for storing.

8. The apparatus according to claim 1 wherein the means for deriving comprises:
  a photovoltaic power source for producing voltage in the presence of light energy; and wherein the means for storing comprises:
  a capacitor for accumulating electrical charge in response to the voltage developed by the photovoltaic power source.

9. The apparatus according to claim 1 wherein the operational means comprises:
  clock means, consuming insignificant power from the means for storing electrical energy, for keeping time;
  computer means for performing at all times as the function other than communication a computational function, not including timekeeping, that consumes power at the first rate, and for performing at other times the communication function that consumes power at the second rate;
  power gating means, responsive to the time kept by the clock means, for interrupting power supplied to the computer means by the means for storing electrical energy during substantial periods when the computer means is performing the computational function, the power gating means being without any effect on (i) the continuous supply of power to the clock means by the means for storing electrical energy, and (ii) the supply of power to the computer means and to the clock means from the transportable power source means through the connection means;
  wherein the means for deriving and the means for storing are facilitated to power the operational means at the first rate for the computational function because the operational means, although continuously powered, exhibits substantial periods when insignificant power is used.

10. The apparatus according to claim 1
wherein the connector means is actuated for selectively electrically connecting the transportable power source means to the operational means by a manual plugging of the transportable power source means to the operational means;
wherein because the connector means selectively connects the operational means to the transportable power source means during all times that the operational means is performing its communication function, and because the selective electrical connection is actuated by manual plugging, then the duration of the manual plugging of the transportable power source means to the operational means defines the time interval of the communication function of the operational means.

11. A method of powering a system that at times performs a function other than communication that consumes power at a first, relatively lower rate, and that at other times performs a communication function that consumes power at a second, relatively higher, rate, the method comprising:
deriving electrical energy from radiant energy incident upon the system;
storing the electrical energy;
powering the system at the relatively lower first rate for the function other than communication from the stored electrical energy;
electrically connecting a transportable power source to the system during all such times as it performs the communication function;
powering the system at the relatively higher second rate for the communication function from the electrically connected transportable power source.

12. A system for storing energy from light as electrical charge comprising:
a photovoltaic power source for producing voltage in the presence of light energy;
a diode connected to the photovoltaic power source;
a capacitor connected through the diode across the photovoltaic power source for accumulating electrical charge in response to the voltage developed by the photovoltaic power source;
a voltage sensor, connected across the capacitor for producing a control signal when the charge upon the capacitor exceeds a predetermined reference level;
a delay circuit, connected to the voltage sensor for receiving the control signal therefrom, for delaying in time the control signal in order to produce a delayed control signal; and
a controllable electrical shunt circuit, connected across the photovoltaic power source and receiving the delayed control signal from the delay circuit, for short circuiting the voltage produced by the photovoltaic power source selectively during receipt of the delayed control signal.

13. The system according to claim 12 wherein the photovoltaic power source comprises:
two photovoltaic modules connected in series to each other at a common terminal of each; wherein the diode comprises;
two diodes, each connected in an opposite polarity to a remaining terminal of a respective one of the two photovoltaic modules;
wherein the capacitor comprises:
two capacitors connected in series to each other and each connected through a respective one of the two diodes to a respective one of the two photovoltaic modules, a common terminal of the series-connected capacitors being connected to the common terminal of the series-connected photovoltaic modules;
wherein the voltage sensor comprises:
two voltage sensors, each connected across a respective one of the two capacitors, for each producing a respective control signal when the charge upon the respective capacitor exceeds a respective predetermined reference level;
wherein the delay circuit comprises:
two delay circuits, each connected to a respective one of the two voltage sensors for receiving the respective control signal therefrom, for each delaying in time the respective control signal to produce a respective delayed control signal; and
wherein the controllable electrical shunt circuit comprises:
two controllable electrical shunt circuits, each connected across a respective one of the two photovoltaic modules and each receiving a respective delayed control signal from a respective one of the two delay circuits, for each short circuiting the voltage produced by a respective one of the two photovoltaic modules selectively during receipt of the respective delayed control signal.

14. The system according to claim 12 wherein the photovoltaic module comprises:
amoprhous silicon.

15. The system according to claim 12 wherein the capacitors comprise:
supercaps, meaning capacitors each having a capacitance greater than 0.2 farad.

16. A method of electrically powering a device that quiescently uses electrical power of a relatively lessor rate but which responds to asynchronous demands to use electrical power at a relatively greater rate, the method comprising:
photoconverting light energy into first electrical power;
continuously first-supplying the first electrical power to the device from the photoconverting of light energy into electrical power, the photoconverting and the first supplied first electrical power being sufficient to supply electrical power at a relatively lesser rate to maintain quiescent operation of the device through periods of light and darkness, but being insufficient to reliably satisfy asynchronous demands upon the device to use electrical power of a relatively greater rate, especially if such demands occur during periods of darkness;
providing second electrical power from a source of electrical power; and
selectively second-supplying the second electrical power to the device from the source only upon, and for the duration of, each asynchronous demand that the device should use electrical power at a relatively greater rate, the source suppling the electrical power at the relatively greater rate during the duration of demand for same.

17. The method according to claim 16 further comprising:
manually connecting and disconnecting the source of electrical power to the device;

wherein the selectively second-supplying is in response to asynchronous demands that are initiated and terminated by act of manually connecting and disconnecting the source;

wherein the origin of an asynchronous demand to use electrical power at a relatively greater rate is resultant from the connection of the same source that provides this electrical power at the relatively greater rate.

18. The method according to claim 17 wherein the second-supplying is from a portable battery energy source.

19. A dual-sourced circuit for receiving and storing electrical power comprising:

a first source of power including a battery-powered source of direct current;

a second source of power including a photovoltaic power source, connected in electrical parallel with the first source of power and diode isolated therefrom, for providing direct current during periods of exposure to light;

an energy storage means for storing electrical power; and an energy storage control means, connecting the electrically parallel first and second sources of power to the energy storage means, for gating direct current from both the first source of power and the second source of power to the energy storage means until the energy storage means stores a predetermined amount of electrical power.

20. The circuit according to claim 19 further comprising:

a voltage regulator connected to the energy storage means for supplying energy stored therein to a load at a predetermined voltage level.

21. The circuit according to claim 20 further comprising:

a voltage monitoring circuit connected to the voltage regulator for providing an alarm signal upon such times as the predetermined voltage level supplied by the voltage regulator to the load is outside of a predetermined voltage range.

22. The circuit according to claim 19 wherein the battery-powered source of direct current is current regulated.

23. The circuit according to claim 22 wherein the battery-powered source of regulated direct current comprises:

a battery source of direct current;

a switching regulator connecting to the battery for regulating direct current received therefrom to produce regulated direct current.

24. The circuit according to claim 19 wherein the energy storage means comprises:

a capacitor for storing energy as electrical charge.

25. The circuit according to claim 24 wherein the energy storage control means comprises:

a diode, connected between the electrically parallel first and second sources of power and the capacitor;

a voltage sensor, connected across the capacitor, for producing a control signal when the electrical charge upon the capacitor exceeds a predetermined reference level;

a delay circuit, connected to the voltage sensor for receiving the control signal therefrom, for delaying in time the control signal in order to produce a delayed control signal; and a controllable electrical shunt circuit, connected across the electrically parallel first and second sources of power and receiving the delayed control signal from the delay circuit, for short circuiting the voltage produced by the first and the second sources of power selectively during receipt of the delayed control signal.

26. An irrigation controller comprising:

power means for providing power;

control means, consuming when operating a first rate of electrical power, for conducting irrigation cycles at timed intervals, and for time durations, that are both determined by elapsed real time, when and if operatively powered at the first rate to so conduct irrigation cycles;

clock means, consuming a second rate of electrical power that is lower than the first rate, constantly operative for keeping the elapsed real time by which the irrigation cycles may be conducted by the control means; and power enablement means responsive to the clock means for selectively gating power at the first rate from the power means to the control means upon, and for duration of, the timed intervals;

wherein the selective gating of power by the power enablement means permits that the control means is operatively powered at the first rate to conduct irrigation cycles only at intervals, and is otherwise unpowered.

27. A light-energized irrigation system controller characterized by low energy use, the controller comprising:

a photovoltaic module
  (i) installable in geographic locations at times of the year and at illumination levels due to sun angle and atmospheric conditions,
  (ii) installable in locations with partially obstructed skyview, and
  (iii) having a collection area, a light transmission loss, and a light to energy conversion technology, that are collectively such as to provide a worst case diurnal energy collection ability of less than 10 mwH;

an energy storage means receiving the energy collected by the photovoltaic module and, upon such times as that energy is less than 10 mwH, storing that energy without leaking away more than 4 mwH in any 24 hour period $-10°$ C. to 70° C., therein making that from 0 to 6 mwH are available to do productive work upon a worst case energy collection;

a programmable irrigation controller controlling a plurality of valves, the irrigation controller and the plurality of valves all powered exclusively by the energy storage means, wherein the combined daily energy consumption of the controller and the values for up to sixteen complete cycles of each valve is in total less than 6 mwH;

therein making that an irrigation system controller is energizable exclusively by light energy diurnally collected at levels as low as 10 mwH.

28. An electrically-powered irrigation controller comprising:

a clock;

logic circuitry for producing electrical signals useful to control the conduct of irrigation; and means responsive to the clock for disabling a substantial amount of the logic circuitry between certain diurnal time periods when functioning of the logic circuitry is enabled, the logic circuitry consuming negligible power while disabled.

* * * * *